United States Patent
Gupta et al.

(10) Patent No.: US 9,983,455 B2
(45) Date of Patent: May 29, 2018

(54) ELECTRONIC DEVICE STACK ASSEMBLY

(71) Applicant: Amazon Technologies, Inc., Seattle, WA (US)

(72) Inventors: Siddharth Gupta, San Bruno, CA (US); Jerry Yee-Ming Chung, Los Altos, CA (US); Hany Mounir Ghali, San Francisco, CA (US); Robert L. D. Zenner, San Jose, CA (US); Juho Ilkka Jalava, Santa Clara, CA (US); Sherman Shwe Win Tan, Sunnyvale, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 15 days.

(21) Appl. No.: 14/978,142

(22) Filed: Dec. 22, 2015

(65) Prior Publication Data

US 2017/0176835 A1 Jun. 22, 2017

(51) Int. Cl.
| | |
|---|---|
| *G02B 26/00* | (2006.01) |
| *G02B 26/08* | (2006.01) |
| *G02F 1/29* | (2006.01) |
| *G02F 1/167* | (2006.01) |
| *G02F 1/1333* | (2006.01) |
| *F21V 8/00* | (2006.01) |
| *G06F 3/044* | (2006.01) |
| *G06F 3/041* | (2006.01) |

(52) U.S. Cl.
CPC ........... *G02F 1/167* (2013.01); *G02B 6/0073* (2013.01); *G02B 6/0083* (2013.01); *G02F 1/13338* (2013.01); *G02F 1/133305* (2013.01); *G06F 3/044* (2013.01); *G06F 3/0412* (2013.01); *G06F 3/0414* (2013.01); *G06F 2203/04103* (2013.01); *G06F 2203/04106* (2013.01)

(58) Field of Classification Search
USPC ................ 359/237, 242, 265, 267, 270–273, 359/290–292, 295, 296, 298, 321, 315
See application file for complete search history.

(56) References Cited

U.S. PATENT DOCUMENTS

| | | | |
|---|---|---|---|
| 9,004,736 | B1 | 4/2015 | Srinivas et al. |
| 9,030,627 | B1 | 5/2015 | Baldwin |

(Continued)

FOREIGN PATENT DOCUMENTS

JP     2012134022     7/2012

OTHER PUBLICATIONS

Author unknown; Machine translation of JP2012134022 (published Jul. 12, 2012) retrieved on Apr. 7, 2017 from https://patents.google.com/patent/JP2012134022A/en; 39 pgs.

(Continued)

*Primary Examiner* — Brandi Thomas
(74) *Attorney, Agent, or Firm* — K&L Gates LLP

(57) ABSTRACT

An electronic device includes a stack assembly and a cover glass. The stack assembly includes an electrophoretic display sub-assembly for rendering content, a front light sub-assembly comprising a light guide, a light FPC, and a plurality of light sources, and a capacitive touch sensing sub-assembly for detecting touch inputs. A yellow-pigmented tape is applied over the light sources and an edge of the light guide. A stiffener member is coupled to the light FPC opposite the yellow-pigmented tape.

20 Claims, 20 Drawing Sheets

(56) References Cited

U.S. PATENT DOCUMENTS

| | | |
|---|---|---|
| 9,041,686 B2 | 5/2015 | Zehner et al. |
| 2008/0158472 A1* | 7/2008 | Chung ............... G02F 1/13452 349/60 |
| 2014/0062939 A1* | 3/2014 | Zehner .................. G06F 3/044 345/174 |
| 2014/0192006 A1 | 7/2014 | Rathnam |
| 2015/0004382 A1 | 1/2015 | Menon et al. |
| 2015/0334859 A1* | 11/2015 | Lee ..................... H05K 5/0247 361/749 |

OTHER PUBLICATIONS

Author unknown; International Search Report and Written Opinion of PCT/US206/065958; dated Mar. 24, 2017; 11 pgs.

* cited by examiner

ELECTRONIC DEVICE STACK ASSEMBLY

BACKGROUND

Portable electronic devices, such as electronic book (e-book) readers or tablet computers, have become increasingly popular. Due to the time required to read lengthy novels or other types of e-books, lightweight e-book readers are desirable in order to promote reading for hours at a time. One constraint on usability for portable electronic devices is their durability to withstand accidental falls of the devices and accidental impacts of objects onto the devices. However, increasing the durability of electronic devices typically has the undesirable effect of increasing the weight of the devices due to the increased structural strengthening. Accordingly, there is a need for improved electronic devices with adequate durability to withstand device stress testing while minimizing overall device weight.

DETAILED DESCRIPTION

Figure 1:
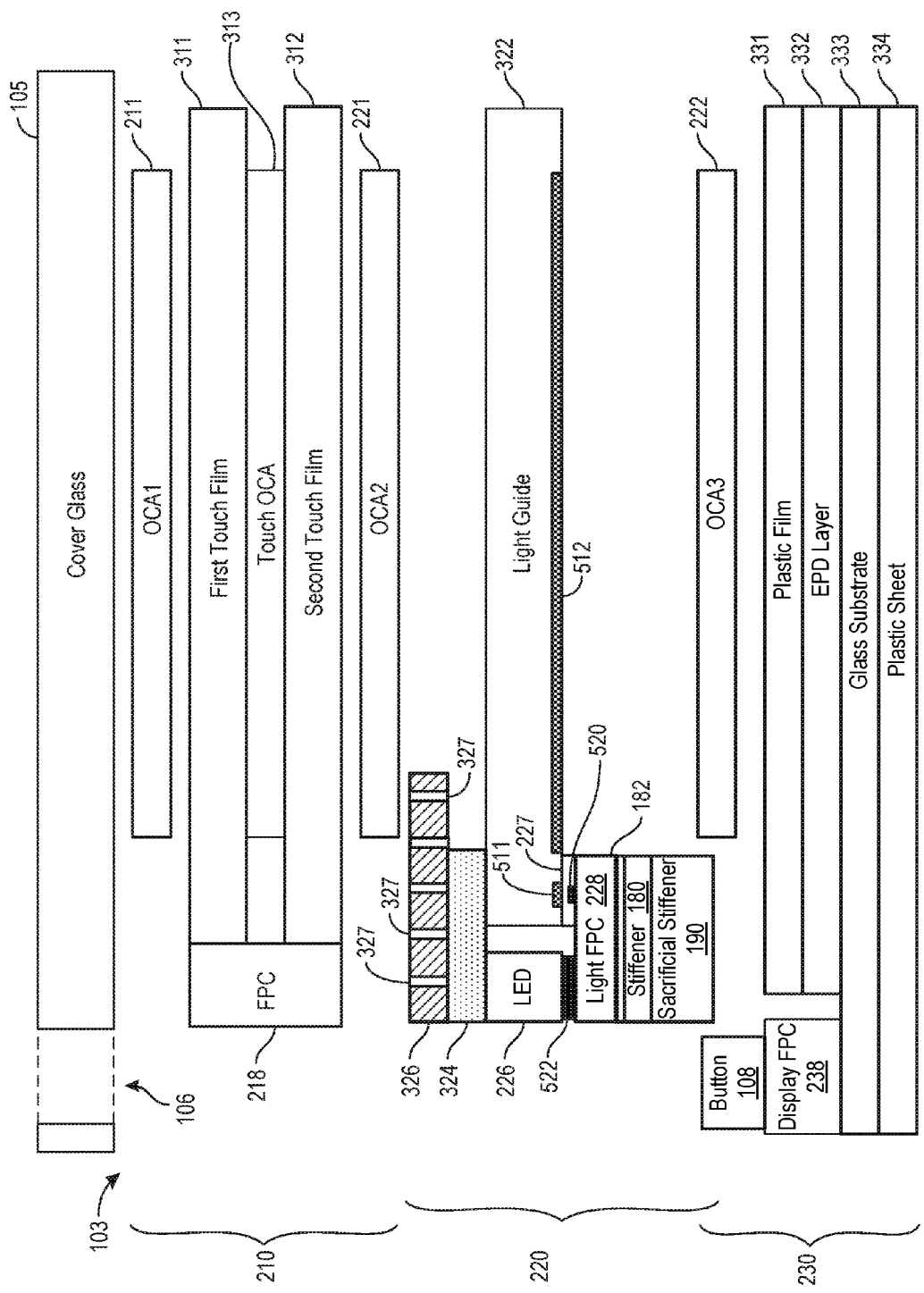
FIG. 1 illustrates an example exploded schematic cross section of a stack assembly and a cover glass, in accordance with embodiments of the present invention.

In the following description, reference is made to the accompanying drawings, which illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale.

In accordance with aspects of the present invention, an electronic device, such as an e-book reader, may have a stack assembly or a component stack comprising a stack of sub-assemblies or laminated sub-assemblies, such as an electrophoretic display (EPD), for rendering content, a light sub-assembly including a plurality of light-emitting diode (LED) light sources and a light guide layered on top of the EPD for illuminating the EPD, and a capacitive touch sensor layered on top of the light sub-assembly for detecting touch inputs. Each sub-assembly may be adhered to another sub-assembly with an optically clear adhesive (OCA), which collectively may form a touch-sensitive, front-lit EPD that is capable of accepting user input and rendering content in low ambient light conditions.

In accordance with embodiments of the present invention, in the light sub-assembly, a first tape layer is applied along one edge of the light guide above the LED light sources, the first tape layer being predominantly white in color but with a yellow pigment added to the first tape layer's adhesive. This yellow-pigmented tape provides a more uniform and consistent color across the surface of the display, and reduces the color gradient naturally created as light travels through the light guide away from the light sources.

In accordance with embodiments of the light sub-assembly, a second tape layer is applied along one edge of the light guide above the first tape layer and the LED light sources. The second tape layer is black in color and provides an opaque cover over the LED light sources to absorb or block undesired stray light from the light sources.

In accordance with embodiments of the light sub-assembly, the second tape layer may be perforated to permit air trapped underneath the second tape layer to flow out through the perforations, thereby reducing the likelihood of air bubbles forming under the second tape layer.

In accordance with embodiments of the light sub-assembly, the light sub-assembly comprises a display flexible printed circuit (FPC) onto which the LED light sources are mounted. In addition, the light guide is formed with a pattern of optical surface features to distribute light across the surface of the visible display area. During the formation of the optical surface features, an optical alignment feature is also formed on the light guide. A target fiducial is formed on the light FPC to be aligned with the optical alignment feature on the light guide to facilitate accurate alignment of the pattern of optical surface features to the LED light sources mounted on the light FPC.

In accordance with embodiments of the light sub-assembly, the pattern of optical grating elements on the light guide is also formed in a region beyond the area corresponding to the visible display area. The formation of this additional pattern outside the visible display area can improve the surface cosmetics of the light guide.

In accordance with embodiments of the light guide, one or more fiducial marks are formed on the light guide for the purpose of aligning the light guide for die cutting. Because accurate positioning of the visible display area of the light guide with the LED light sources is an important feature, these fiducial marks for guiding the cutting process may be formed along the edge of the light guide that will be closest to the LED light sources.

In accordance with embodiments of the light sub-assembly, one or more stiffener members may be coupled to the light FPC opposite the LED light sources. A first stiffener member may comprise a rigid plate of metal or plastic, which is adhered to the lower side of the light FPC. The combined stiffener member and light FPC has a greater rigidity, which can help to prevent unwanted bending or deformation of the light FPC prior to attachment to the light guide, thereby providing better alignment of the LED light sources on the light FPC.

In accordance with embodiments of the light sub-assembly, a second sacrificial stiffener member may be temporarily attached to the first stiffener member to further improve the planarity of the light FPC before the light FPC is attached to the light guide. The sacrificial stiffener member may be adhered to the first stiffener member opposite the light FPC using a low-strength adhesive. After the light FPC is coupled to the light guide, the sacrificial stiffener member may be removed from the first stiffener member and the assembly process for the device may continue.

In accordance with embodiments of the present invention, multiple autoclave processes are used during the assembly process of the display stack.

In accordance with embodiments of the present invention, various layers of the display stack, such as the EPD and light guide, may be processed with a plasma treatment to improve the adhesion of those layers with adjacent OCA layers.

In accordance with embodiments of the present invention, two different sealing materials may be applied to the edges of the EPD. A first sealing material for preventing moisture entry into the EPD is formed using an edge cure (EC) process. This first sealing material is formed along all sides of the EPD except at the two corners closest to the light FPC. Those two corners are separated from the active area of the EPD, and are therefore not as sensitive to moisture entry. At those two corners, a second sealing material is applied using room temperature vulcanization (RTV). The RTV sealing material permits easier handling of the EPD than the EC sealing material, thereby enabling easier manufacturing.

In accordance with embodiments of the present invention, openings are formed in the cover glass and page-turn buttons are positioned in those openings. The edges of the cover glass forming those openings are not covered with any light-blocking layers, thereby permitting light to be emitted from those edges and illuminating the perimeters of those buttons.

In accordance with embodiments of the present invention, a conductive element is positioned near the page-turn buttons. This conductive element extends to the edge of the device, where it is electrically coupled to a conductive spring clip. The conductive spring clip is electrically coupled to the mid-frame of the device and provides an electrostatic discharge (ESD) ground path for the buttons.

Figure 2:
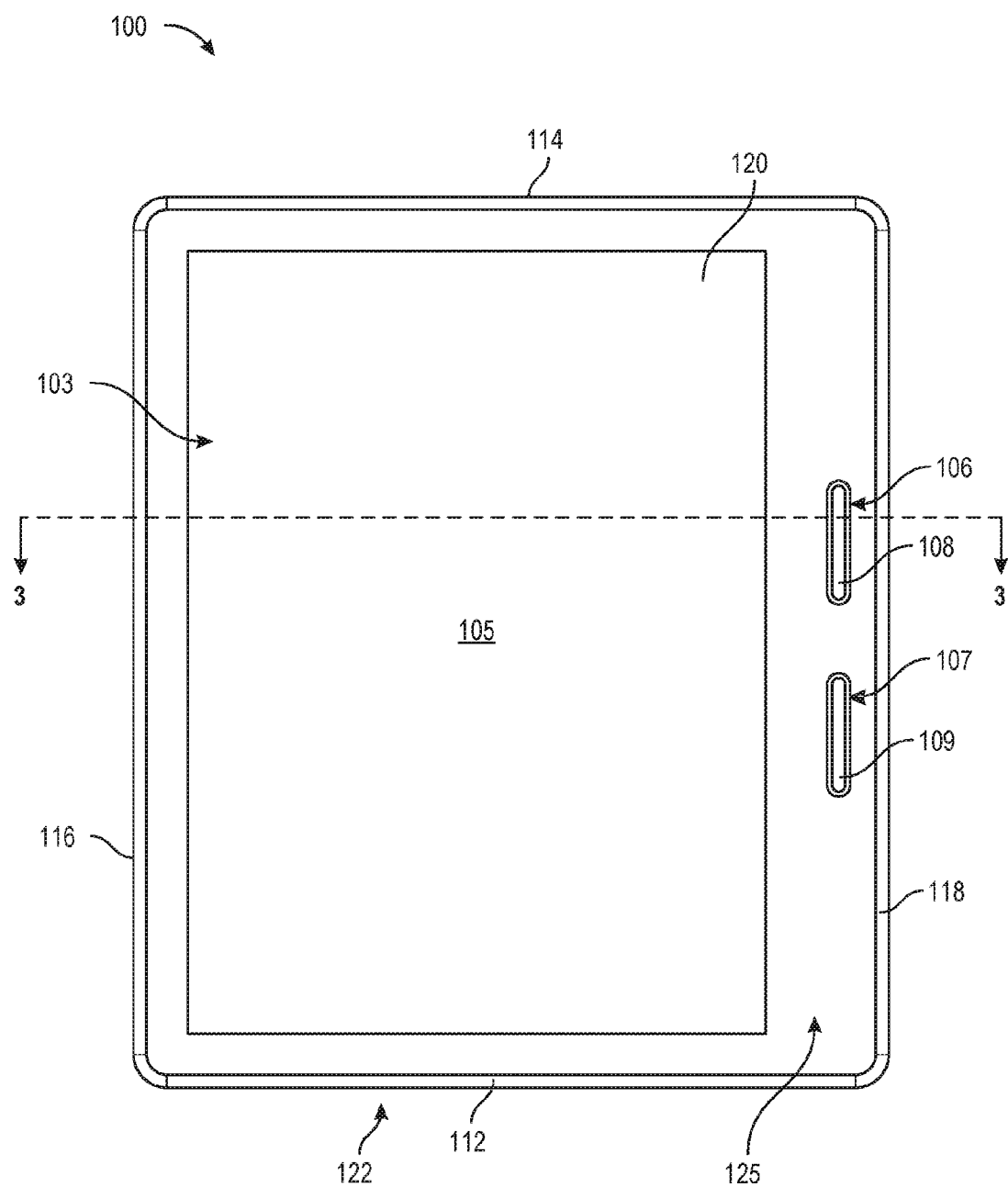
FIG. 2 illustrates an electronic device, in accordance with embodiments of the present invention.

FIG. 2 illustrates an electronic device 100, such as an electronic reader device, in accordance with embodiments of the present invention. The electronic device 100 comprises a stack assembly 103 coupled to a cover glass 105 through which images, content, or content items produced by the stack assembly 103 may be viewed by a user. In some embodiments, the stack assembly 103 may comprise a six inch, 300 dots per inch (DPI) EPD. FIG. 1 illustrates an example exploded schematic cross section of the stack assembly 103 and the cover glass 105 at line 3-3 of the embodiment of FIG. 2, in accordance with embodiments of the present invention. It will be understood that the cross section is not drawn to scale, with some features drawn larger relative to the other features for ease of illustration and reference.

The cover glass 105 may provide a protective exterior front surface of the electronic device 100, and may comprise a strengthened glass or a toughened glass. For example, before initiation of a glass-strengthening process, the cover glass 105 may be prepared by cutting the cover glass 105 to size from a master sheet of glass, including cutting or drilling apertures 106-107, in which buttons 108-109 are positioned. Under some embodiments, the outer surface of the cover glass 105 may be prepared to provide a particular feel or roughness, such as a feel or roughness that simulates that of paper. Preparation of the cover glass 105 may include etching, abrading, polishing or the like to provide a paper-like feel or roughness. Under some embodiments, the cover glass 105 may be prepared with a chemical etching that acts as an antiglare or light-diffusing element. Such may be advantageous when the electronic device 100 is used in direct sunlight. In other embodiments, the cover glass may be formed out of materials other than glass, such as, e.g., polycarbonate.

After preparation of the cover glass 105, the cover glass 105 may then be subject to a glass-strengthening process, such as a chemical treatment or an ion exchange treatment. For example, the cover glass 105 may be immersed in a molten potassium salt at a high temperature, such that smaller sodium ions of the surface of the cover glass 105 may be replaced by larger potassium ions from the salt bath. The larger ions may provide a layer at the surface of the cover glass 105 that has compressive strength, which may improve the strength of the cover glass 105. Because the cover glass 105 may be prepared or cut prior to the ion exchange, not only are the front and back surfaces of the cover glass 105 strengthened, but the edges of the cover glass 105 may be strengthened as well, including the edges of the apertures 106-107. For example, an aperture 106-107 may be defined by a first opening, an opposite second opening, and an inner surface extending from the first opening to the second opening. The inner surface may be strengthened. Such may be advantageous to fully strengthen all exposed edge or side surfaces of the cover glass 105, in addition to the front and back surfaces. Under some embodiments, the cover glass 105 may be made from materials such as glass, fortified glass, reinforced glass, as well as glass imitations such as plastic, thermoplastic, and the like.

The electronic device 100 may comprise a first button 108 and a second button 109, such as page-turn control buttons, which may be actuated by a user to, for example, turn a page of an electronic book. The cover glass 105 may comprise a first aperture 106 and a second aperture 107 within which the first button 108 and the second button 109 respectively reside. It is to be understood that the electronic device 100 may have no buttons, one button, or more than two buttons. In the embodiment illustrated in FIG. 2, the symmetric design of the page-turn buttons may be advantageous to allow a user to hold the electronic device 100 with the right hand, and based on the screen orientation, the second button 109 may be depressed by the thumb of the user to turn to a next page of a book, and the first button 108 may be depressed by the thumb of the user to turn to a previous page of the book. Furthermore, if the device is rotated by a user to be held in the left hand, then based on the screen orientation, the first button 108 may be depressed to turn to a next page of the book and the second button 109 may be depressed to turn to a previous page of the book.

Under some embodiments, after the cover glass 105 is strengthened, a surface of the cover glass 105, such as the edges of the cover glass 105 defined by the aperture 106 or the aperture 107, may be treated to remove or counteract defects such as micro-cracks, miniscule blemishes, or the like. Such defects may, for example, occur or arise during the process of manufacturing or cutting the cover glass 105. Under an embodiment, a surface of the cover glass 105 may be polished to substantially remove such defects. Under another embodiment, glue may be applied to a surface of the cover glass 105 to fill or coat such defects. For example, optically clear glue may be applied, which may be advantageous to reduce the noticeability of such optically clear glue. For further example, opaque glue may be applied to block or reduce light that may shine or leak from a surface of the cover glass 105. Under some embodiments, opaque glue may be applied to the surface of the cover glass 105 defined by the first aperture 106 or the second aperture 107 to prevent light from leaking out of spaces or gaps between such surfaces and the first button 108 or the second button 109. In other embodiments, an optically clear coating, optically clear glue, or no coating at all may be applied to the edges of the cover glass 105, so as to permit light to be emitted from the edges of the cover glass 105 and into the gaps between such surfaces and the buttons 108-109. As a result, a ring of light may be created around the periphery of each of the buttons 108-109, thereby improving visibility of those buttons 108-109, such as when the device 100 is being operated in the dark. It is to be understood that defects on a surface of the cover glass 105 may be stress risers or stress concentrations, and improving the surface quality of the cover glass 105 may be advantageous to improve the mechanical performance or integrity of the cover glass 105 during events such as bending or dropping.

In some embodiments, a display mask 125 (shown in FIG. 2 but not shown in FIG. 1) may be adhered to the underside of the cover glass 105 to hide from a user's view the components of the electronic device 100 that are underneath the display mask 125. As illustrated in FIG. 2, the display mask may hide certain components beneath portions of the cover glass 105, while allowing the images of the stack assembly 103 to be viewable. The display mask may define the visible display area in which images are viewable by the user. The electronic device 100 may comprise a bottom side portion 112, a top side portion 114, a left side portion 116, a right side portion 118, a front portion 120, and a back portion 122. It is to be understood that references to positions of the electronic device 100, such as top, bottom, left, right, front, and back are for illustrative purposes, and are not to be considered limiting.

Figure 3:
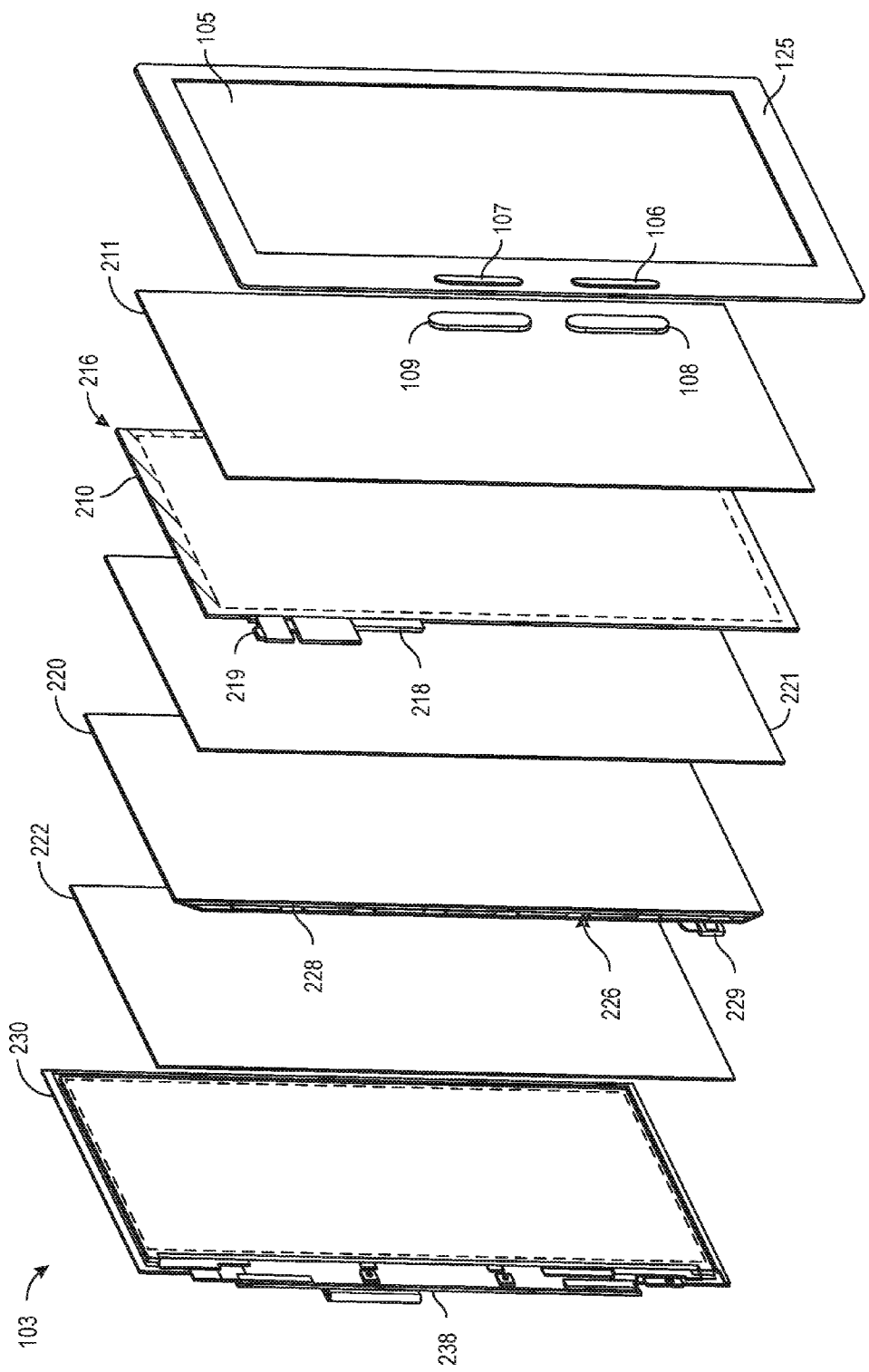
FIG. 3 illustrates an example exploded view of a stack assembly and cover glass, in accordance with embodiments of the present invention.

FIG. 3 illustrates an example exploded view of a stack assembly 103 and a cover glass 105, in accordance with embodiments of the present invention. In the embodiment shown, the cover glass 105 comprises a first aperture 106 and a second aperture 107, as well as a display mask 125. The stack assembly 103 also comprises a touch sub-assembly 210, a light sub-assembly 220, and a display sub-assembly 230.

The touch sub-assembly 210 may be coupled to the cover glass 105 via a first optically clear adhesive (OCA1) layer 211 or other optically clear bonding material. The OCA1 layer 211 may be solid OCA or liquid OCA, and may comprise material such as silicone, acrylic, or the like. Under some embodiments, a sheet of solid OCA may laminate the touch sub-assembly 210 with the cover glass 105. The OCA1 layer 211 may comprise a material with ultraviolet (UV) cut capabilities. For example, the UV cut material may block, cut out, stabilize or absorb light with a wave length of about 390 nm or lower. Such UV cut material may provide a UV filter for the purpose of protecting components lower in the stack assembly from UV light that may be incident on the electronic device 100. For example, the UV cut material may cause the display sub-assembly 230 to have reduced discoloration, such as a yellowing discoloration, due to exposure to UV light. A UV cut material may comprise, for example, hindered amine light stabilizers (HALS) or the like, which may absorb UV light and dissipate such UV light into thermal energy.

Under some embodiments, instead of or in addition to the OCA1 layer 211 having UV cut capabilities, the touch sub-assembly 210 may have UV cut capabilities. For example, a coating of UV absorbing material may be applied to a top surface of the touch sub-assembly 210 or UV absorbing material may be integrated or embedded into the touch sub-assembly 210. For example, the touch sub-assembly may comprise a material such as polyethylene terephthalate (PET) or a low birefringence material such as a cyclic olefin polymer (COP), and UV cut material may be integrated into such material of the touch sub-assembly 210. Under some embodiments, UV cut material may be coated to a bottom surface of the cover glass 105. Such may be advantageous because the cover glass 105 may be able to withstand higher temperatures as compared to the touch sub-assembly 210, which may facilitate a higher temperature application of the UV cut material. UV cut capabilities of the touch sub-assembly 210 or the cover glass 105 may be advantageous, for example, to reduce yellowing of PET material or flaking of COP material. Furthermore, UV cut capabilities may preserve optically transparent properties of the touch sub-assembly 210 as well as other sub-assemblies beneath the touch sub-assembly 210, such as the light sub-assembly 220.

It is to be understood that a user may cause the device 100 to perform an action by interacting with the touch sub-assembly 210. For example, an action may be turning the page of an electronic book. Interacting with the touch sub-assembly 210 may comprise applying a touch or multiple touches to a portion of the cover glass 105. In some embodiments, the touch sub-assembly may be capable of detecting touches as well as determining an amount of pressure or force of those touches. A touch sub-assembly 210 may comprise a capacitance touch sensitive sensor, an infrared touch screen sensor, a force sensitive resistance sensor, or the like.

The touch sub-assembly 210 may comprise a touch flexible printed circuit (FPC) 218 having a touch connector 219 (shown in FIG. 2). The touch FPC can provide electrical connectivity of various electronic components on the touch FPC with other components of the device 100. A portion of the touch FPC 218 adjacent to the touch connector 219 may be adhered to the cover glass 105. Such may be advantageous to prevent vibration or other movement of the device 100 from causing the portion of the touch FPC 218 to scratch the cover glass 105 or the display mask 125 of the cover glass 105.

The touch sub-assembly 210 may also comprise signal lines or traces along the outer edge or border of the touch sub-assembly 210. As shown, the touch sub-assembly 210 may also comprise an antenna window portion 216 (shown in FIG. 2) or keep-out area of nonconductive material. For example, an antenna positioned adjacent to an antenna window portion 216 of nonconductive material may have reduced shielding as compared to an antenna covered by a conductive material, such as high-conductivity metal. An antenna positioned in an antenna window may have improved transmission and reception capabilities due to a distance, clearance, or separation from conductive elements of the electronic device 100, such as the signal lines. Under some embodiments, the signal lines may be provided along a first edge of the touch sub-assembly 210 to which the touch FPC 218 is coupled. Signal lines may also be provided along a second edge of the touch sub-assembly 210 that is opposite to a third edge having the antenna window portion 216. The first edge may be between the second edge and the third edge of the touch sub-assembly 210. Positioning signal lines along the first edge and the second edge of the touch sub-assembly 210 may be advantageous to keep the antenna window portion 216 free of conductive material. Under some embodiments, the antenna window portion 216 may include a fourth edge that is opposite the first edge and in between the second edge and the third edge of the touch sub-assembly 210.

The light sub-assembly 220 may comprise one or more light sources 226, such as light emitting diode light sources (LEDs), provided along an edge of the light sub-assembly 220. As shown, the light sub-assembly 220 may also comprise a light FPC 228 having a light connector 229. It is to be appreciated that under some embodiments, the light connector 229 may be generally positioned along an opposite end of an edge in relation to the touch connector 219. The light FPC 228 may be coupled to the light guide 322 using, for example, a fourth OCA (OCA4) layer 227. The light sub-assembly 220 may be coupled to the touch sub-assembly 210 via a second OCA (OCA2) layer 221 or other optically clear bonding. The OCA2 layer 221 may be solid OCA or liquid OCA, and may comprise a material such as silicone, acrylic, or the like.

The display sub-assembly 230 may represent an array of display technologies suitable for the desired application. The display sub-assembly 230 may comprise, for example, an EPD, electrowetting display, electrofluidic display, interferometric modulator display, and/or any other type of bi-stable display. Alternatively, the display sub-assembly 230 may comprise another type of device capable of rendering visible images, such as, e.g., liquid crystal display (LCD) screens, gas plasma-based flat panel displays, LCD projectors, etc. Though not shown, in some embodiments, the display sub-assembly 230 may be coupled to a corresponding display controller.

The display sub-assembly 230 may comprise a display FPC 238. The display FPC 238 may comprise a touch socket 510 and a light socket 520, with each positioned on opposing ends of the display FPC 238 along a side of the display sub-assembly 230. It is to be understood that the position of the touch socket 510 may correspond to the position of the touch connector 219 of the touch FPC 218, and the position of the light socket 520 may correspond to the position of the light connector 229 of the light FPC 228. Under some embodiments, the sockets 510,520 and the connectors 219, 229 may couple via board-to-board coupling. Under other embodiments, the connectors 219,229 may be respectively bonded to the sockets 510,520, for example with anisotropic conductive film (ACF).

In an embodiment, the display sub-assembly 230 may comprise an electrophoretic display that moves particles between different positions to achieve different color shades. For instance, with a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are located near the rear of the display, the particles absorb the incident light and, hence, cause the pixel to appear black to a viewing user. In addition, particles may situate at varying locations between the front and rear sides of the display to produce varying shades of gray. Furthermore, as used herein, a "white" pixel may comprise any shade of white or off-white, while a "black" pixel may similarly comprise any shade of black.

In another embodiment, the display sub-assembly 230 may comprise an electrophoretic display that includes oppositely charged light and dark particles. In order to render white, the display controller moves the light particles to the front side of the display by creating a corresponding charge at an electrode near the front and moves the dark particles to the back of the display by creating a corresponding charge at an electrode near the back. In order to render black, the display controller changes the polarities and moves the dark particles to the front and the light particles to the back. Furthermore, to create varying shades of gray, the display controller may utilize different arrays of both light and dark particles.

It is to be understood that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to the darkest red of the color filter.

The display sub-assembly 230 may be coupled to the light sub-assembly 220 via a third OCA (OCA3) layer 222 or other optical bonding. The OCA3 layer 222 may be solid OCA or liquid OCA, and may comprise a material such as silicone, acrylic, or the like. Each button 108-109 may be coupled to the display FPC 238 and portions of each button 108-109 may be respectively positioned within and exposed to the user by the first aperture 106 and the second aperture 107. The display FPC 238 may be adhered to the display glass substrate 333 with anisotropic conductive film (ACF).

The stack assembly 103 may comprise the touch sub-assembly 210 that may be adhered to the cover glass 105 via the OCA1 layer 211. The touch sub-assembly 210 may receive touch inputs related to displayed content, such as a touch input to turn the page of an electronic book. Touch sub-assembly 210 may comprise multiple layers. In the illustrated embodiment, the touch sub-assembly 210 comprises a first touch film 311, a second touch film 312, and a touch FPC 218. The first touch film 311 may be adhered to the cover glass 105 via the OCA1 layer 211. The second touch film 312 may be adhered to the first touch film 311 via a touch OCA layer 313. The touch films 311-312 may comprise a PET material. The touch FPC 218 that may be coupled with the display FPC 238. In some embodiments, the touch films 311-312 may comprise patterns made from indium tin oxide (ITO), copper, printed ink or the like, and the patterns may form rows and columns. Such patterns may provide a grid of capacitors that may project an electric field through the cover glass 105, and the capacitance of one or more capacitors may be changed by the placement of a finger near the cover glass 105. The patterns may be coupled to the signal lines described above. It is to be understood that the number of touch films of the touch sub-assembly 210 is not meant to be limiting, and any number of touch films may be used, such as four touch films with each having conductive patterns formed thereon.

The light sub-assembly 220 may be adhered to the touch sub-assembly 210 via the OCA2 layer 221. In the illustrated embodiment, the light sub-assembly 220 comprises a light guide 322, which may be adhered to the second touch film 312 via the OCA2 layer 221. In some embodiments, a refractive index of the OCA2 layer 221 may be less than a refractive index of the light guide 322. For example, the difference between the refractive index of the light guide 322 and the refractive index of the OCA2 layer 221 may be at least about 0.1. In some embodiments, the difference can be about 0.3. For example, if the light guide 322 has a refractive index of 1.58, then the refractive index of the OCA2 layer 221 may be 1.48. It is to be understood that the selection of the material of the light guide 322 may be used to determine the appropriate refractive index of the OCA2 layer 221. It is also to be understood that other OCA layers, such as the OCA3 layer 222, may also have a refractive index that is less than the refractive index of the light guide 322.

The light sub-assembly 220 may comprise one or more light sources 226 and the light guide 322, which may direct light to the display sub-assembly 230. For example, directing light to the display sub-assembly 230 may enhance the visibility of displayed content such as by enhancing the contrast of the displayed content. Under some embodiments, the light guide 322 may comprise a light guide panel having a pattern of optical surface features 512 formed thereon, for directing light from the light sources 226 onto the display sub-assembly 230, thus illuminating the display sub-assembly 230. The light guide 322 may comprise a polycarbonate material, polymethyl methacrylate (PMMA) material, or the like. Under some embodiments, utilizing polycarbonate material may for the light guide 322 provide improved thermal stability. The optical surface features may comprise diffusers, grooves, grating, dimples, lenses, planar surfaces, concave surfaces, convex surfaces, and so forth, which may be used to enhance or attenuate the transmission or dispersion of light from the light sources 226 and through the light guide 322. In some embodiments, these optical surface features may be separate or discrete elements that have been coupled to the light guide 322. For example, a microlens array may be adhered to the light guide 322 to aid the optical coupling with the light sources 226. In other embodiments, the optical surface features may be formed in any number of ways, such as being embossed in a lacquer, injection molded as part of the manufacture of the light guide 322, directly embossed onto the substrate of the light guide 322 or the like. In other examples, the manufacture of the optical surface features includes continuous or discrete casting methods (UV or thermal curing), compression molding, and continuous or discrete embossing, such as hard embossing, soft embossing and UV embossing, and the like. Melt film can also be used. Although many manufacturing processes may be utilized, some may be particularly suitable to manufacturing particular embodiments.

The light source 226 may comprise one or more LEDs, such as ten LEDs, which may reside toward a side edge of the electronic device 100. The light from the light source 226 may generally travel along the plane of the light guide 322 and the display sub-assembly 230 until, for example, they reach the optical surface features, which generally direct the light downward or toward the display sub-assembly 230. In some instances, the multiple LEDs are positioned along the edge of the device 100 such that they collectively illuminate the visible display area of the device 100. Each LED light source 226 may emit light over a particular angle that is in the shape of a triangle. The LED light source 226 may be aligned and spaced (relative to one another and relative to an active area of the display) such that these triangle shapes of emitted light overlap and are distributed by the light guide 322 across the visible display area of the device 100 so as to avoid producing overly bright spots or overly dim spots. Under some embodiments, the distance from the center of one LED to the center of an adjacent LED may be about 12.6 mm.

In accordance with embodiments of the present invention, a first tape layer 324 is applied along the edge of the light guide 322 above the LED light sources (as shown in the orientation depicted in FIG. 1). The first tape layer 324 may applied over the light sources 226 and a first light guide surface portion 423 of the light guide 322. The first tape layer 324 may comprise a white-colored tape (e.g., a white PET film) or other light-diffusing element or light-reflecting element, which may help to diffuse light from the light sources 226 and increase the uniformity of the light from the light sources 226 by reflecting light that shines onto the first tape layer 324.

In accordance with embodiments of the present invention, a second tape layer 326 is applied along one edge of the light guide above the first tape layer and the LED light sources. The second tape layer 326 may be a black-colored tape (e.g., a black PET film), which provides an opaque cover over the LED light sources 226 to absorb or block undesired stray light from the light sources 326. This may be advantageous to maintain uniformity or smoothness of the light propagated by the light sources 326 and to reduce the amount of light that may escape or leak. In some embodiments the adhesive of the first tape layer 324 and the adhesive of the second tape layer 326 may have a refractive index that is less than the refractive index of the light guide 322.

In some displays, as the light from the LED light sources propagates through the light guide, certain wavelengths of the propagating light are absorbed by the light guide at different rates than others. As a result, as white light generated by LED light sources propagates through the light guide, a gradient of color is created across the length of the display as the light travels farther from the LED light sources. It has been observed that the portions of the display farthest from the LED light sources are illuminated by light having a more yellow tint than the light illuminating the portions of the display closest to the LED light sources. This color gradient across the surface of the display can produce an aesthetically unpleasant appearance for the user.

In accordance with embodiments of the present invention, the first tape layer 324 is formed with a color that may reduce the color gradient across the display, as described above. In some embodiments, the first tape layer 324 comprises a white tape having an adhesive formed on one side. The adhesive includes a pigment that imparts a color to the surface of the white tape facing the light sources 226 and light guide 322. When light from the light sources 226 reflects off the pigmented side of the first tape layer 324, the color of the pigment is imparted on the reflected light, thereby causing a color shift in the light whereby the light takes on that color. Accordingly, if a yellow pigment is added to the adhesive, the light reflecting off the first tape layer 324 will acquire a more yellow tint than the light traveling directly from the light sources 226 to the light guide 322. However, the light traveling directly from the light sources 226 to the light guide 322 tends to propagate farther than the light reflecting off the first tape layer 324. As a result, the yellow light reflected off the first tape layer 324 is more prominent in the regions closer to the light sources 226 and gradually decreases at further points along the light guide 322. In contrast, the light traveling directly from the light sources 226 to the light guide 322 is more color-neutral in the regions closer to the light sources 226 and begins to acquire a yellowish tint at points along the light guide 322 further from the light sources 226. The combination of light from the two light sources creates a more uniform yellow tint across the surface of the display, thereby reducing the color gradient across the surface.

In accordance with embodiments of the present invention, the second tape layer 326 may be perforated to permit air trapped underneath the second tape layer to flow out through the perforations. In some situations, when the second tape layer 326 is applied, air may be trapped between the second tape layer 326 and the first tape layer 324, thereby resulting in air bubbles that cause portions of the second tape layer 326 to separate from the underlying structure. These variations in the surface of the second tape layer 326 can cause undesirable variations in the light propagating across the surface of the display. Accordingly, it would be desirable to reduce or eliminate the presence of air bubbles under the second tape layer 326. This may be achieved by forming small perforations 327 in the second tape layer 326 (shown not to scale in FIG. 1).

In accordance with embodiments of the present invention, each perforation 327 may have a diameter of less than about 100 μm, and the perforations 327 may be separated from adjacent perforations 327 by a distance of less than about 1 mm. In other embodiments, the perforations 327 in the second tape layer 326 may be formed in any size and density that does not excessively impact the desired optical properties of the second tape layer 326. If the perforations 327 are too large, this may result in bright spots in the display. If the perforations 327 are too small, the air trapped below the second tape layer 326 may not be able to easily escape through the perforations 327.

As illustrated in FIG. 1, a portion of the second tape layer 326 may overhang the first tape layer 324, and a portion of the OCA2 layer 221 may be adhered to a portion of the second tape layer 326 that overhangs the first tape layer 324. Under some embodiments, the OCA2 layer 221 may comprise a conformable or elastic material that is configured to adhere to the overhang or step of the second tape layer 326 or to absorb the thickness of the second tape layer 326 while maintaining an adequate bond between the light guide 322 and the second touch film 312. The light sub-assembly 220 may include a light FPC 228 that may couple with the display FPC 238.

As shown in FIG. 1, the display sub-assembly 230 may be coupled to the light sub-assembly 220 via the OCA3 layer 222. In some embodiments, a refractive index of the OCA3 layer 222 may be less than a refractive index of the light guide 322. As illustrated, a display plastic film 331 is adhered to the light guide 322 via the OCA3 layer 222. The display sub-assembly 230 may comprise a display glass substrate 333, such as a flexible sheet of glass or a sheet of glass having a thickness of about 0.2 mm. In some embodiments, the display glass substrate 333 may have a thickness that ranges from about 0.025 mm to about 0.2 mm. A display plastic sheet 334 may be adhered to a surface of the display glass substrate 333 via, for example a pressure sensitive adhesive (PSA). The display plastic sheet 334 may comprise a PET material or the like. The display glass substrate 333 may be flexible such that the display glass substrate 333 may be capable of bending during usage without shattering or breaking. A display glass substrate 333 having a thickness of about 0.2 mm may be advantageous because such a display glass substrate 333 may be thin enough to be flexible. The display plastic sheet 334 may support the display glass substrate 333 in such a way as to prevent the display glass substrate 333 from bending or flexing beyond an amount at which shattering or breakage may occur. The display plastic sheet 334 may protect the display glass substrate 333 from scratches, fractures, chips, or other damage to the display glass substrate 333. For example, the display plastic sheet 334 may be less brittle than the display glass substrate 333. In some embodiments, a plastic sheet or other flexible substrate material may be utilized instead of the display glass substrate 333 and the display plastic sheet 334.

The EPD layer 332 may be adhered to the display glass substrate 333. It is to be understood that the EPD layer 332 may comprise a laminate as is commonly known in the art for EPD displays. In some embodiments, the EPD layer 332 may comprise micro-capsules having positively charged white pigment or particles and negatively charged black pigment or particles suspended within a clear fluid such as oil. The EPD layer 332 may also comprise top and bottom electrodes, which may be coupled to the display FPC 238. For example, a thin-film-transistor (TFT) layer may be provided between the display glass substrate 333 and the EPD layer 332, and between the display plastic film 331 and the EPD layer 332, there may be a single electrode which serves as a common electrode. Such top and bottom electrodes may apply a positive or negative electric field such that corresponding particles move to the top of the micro-capsule where they become visible to the user. The display plastic film 331 may be adhered to the EPD layer via an optically clear adhesive. It is to be understood that although the display plastic film 331 is illustrated as a separate layer from the EPD layer 332, in some embodiments, the EPD layer 332 and the display plastic film 331 may be formed as a single component. The display plastic film 331 may comprise a PET material or the like.

In some embodiments, the cover glass 105 may have a thickness of about 550 μm. The OCA1 layer 211 may have a thickness of about 0.15 mm. The first touch film 311 and the second touch film 312 may each have a thickness of about 100 μm, and the touch OCA layer 313 may have a thickness of about 50 μm. The OCA2 layer 221 may have a thickness of about 0.15 mm. The light guide 322 may have a thickness of about 400-500 μm. The first tape layer 324 may have a width of about 4.76 mm along the edge of the light guide 322, and the second tape layer 326 may have a width of about 7.5 mm along the edge of the light guide 322. The OCA3 layer 222 may have a thickness of about 0.175 mm. The display plastic film 331 may have a thickness of about 116 μm, an optically clear adhesive between the display plastic film 331 and the EPD layer may have a thickness of about 50 μm, the EPD layer 332 may have a thickness of about 192 μm, the display glass substrate 333 may have a thickness of about 0.2 mm, and the display plastic sheet 334 may have a thickness of about 143 μm. It is to be understood that the dimensions are for illustrative purposes, and other suitable dimensions may be utilized. It is to be further understood that a stack assembly 103 may comprise different layers than those schematically shown in FIG. 1, and that those variations of layers are encompassed within the embodiments disclosed herein.

Figure 4A:
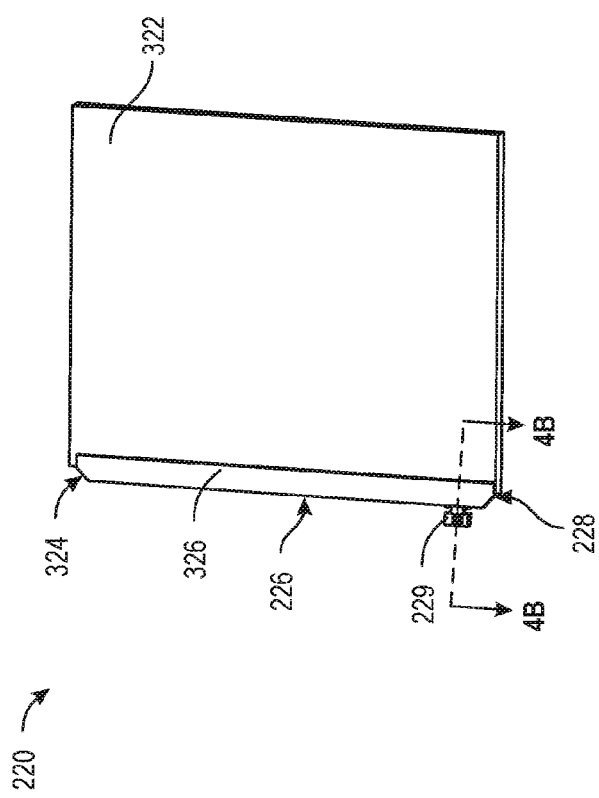
FIGS. 4A-4B illustrate an example light sub-assembly, in accordance with embodiments of the present invention.
Figure 4B:
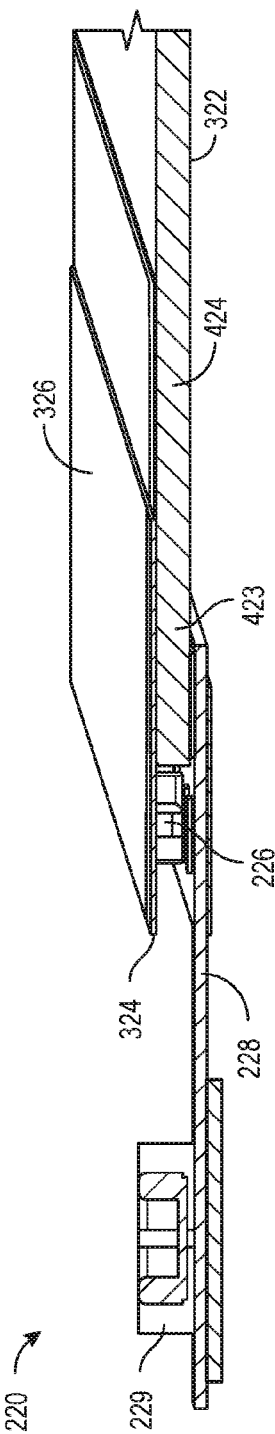

FIGS. 4A-4B illustrate an example light sub-assembly 220, in accordance with embodiments of the present invention. FIG. 4A illustrates a front view of a light sub-assembly 220 having a light guide 322. Although not visible in the illustration of FIG. 4A, a plurality of light sources 226 may be positioned along the edge of the light guide 322. As illustrated, the second tape layer 326 may be positioned above the light sources 226 along the edge of the light guide 322, and the first tape layer 324, which is not visible in FIG. 4A, may be positioned along the edge of the light guide 322 underneath the second tape layer 326. A light connector 229 may be coupled to the light FPC 228, which may be electronically coupled to the light source 226 and mechanically coupled to the light guide 322. The light connector 229 may be configured to couple to the light socket 520 of the display FPC 238.

FIG. 4B illustrates a cross-sectional perspective view of a light sub-assembly 220 at line 4B-4B of the embodiment of FIG. 4A. The light connector 229 may be coupled to the light FPC 228. The light FPC 228 may be mechanically coupled to the light guide 322 with an OCA layer (not shown). The light FPC 228 may be electronically coupled to the light source 226. The first tape layer 324 may be adhered to the light source 226 and to a first light guide surface portion 423 of the light guide 322. The second tape layer 326 may be adhered to the first tape layer 324 and to a second light guide surface portion 424 of the light guide 322.

Figure 5A:
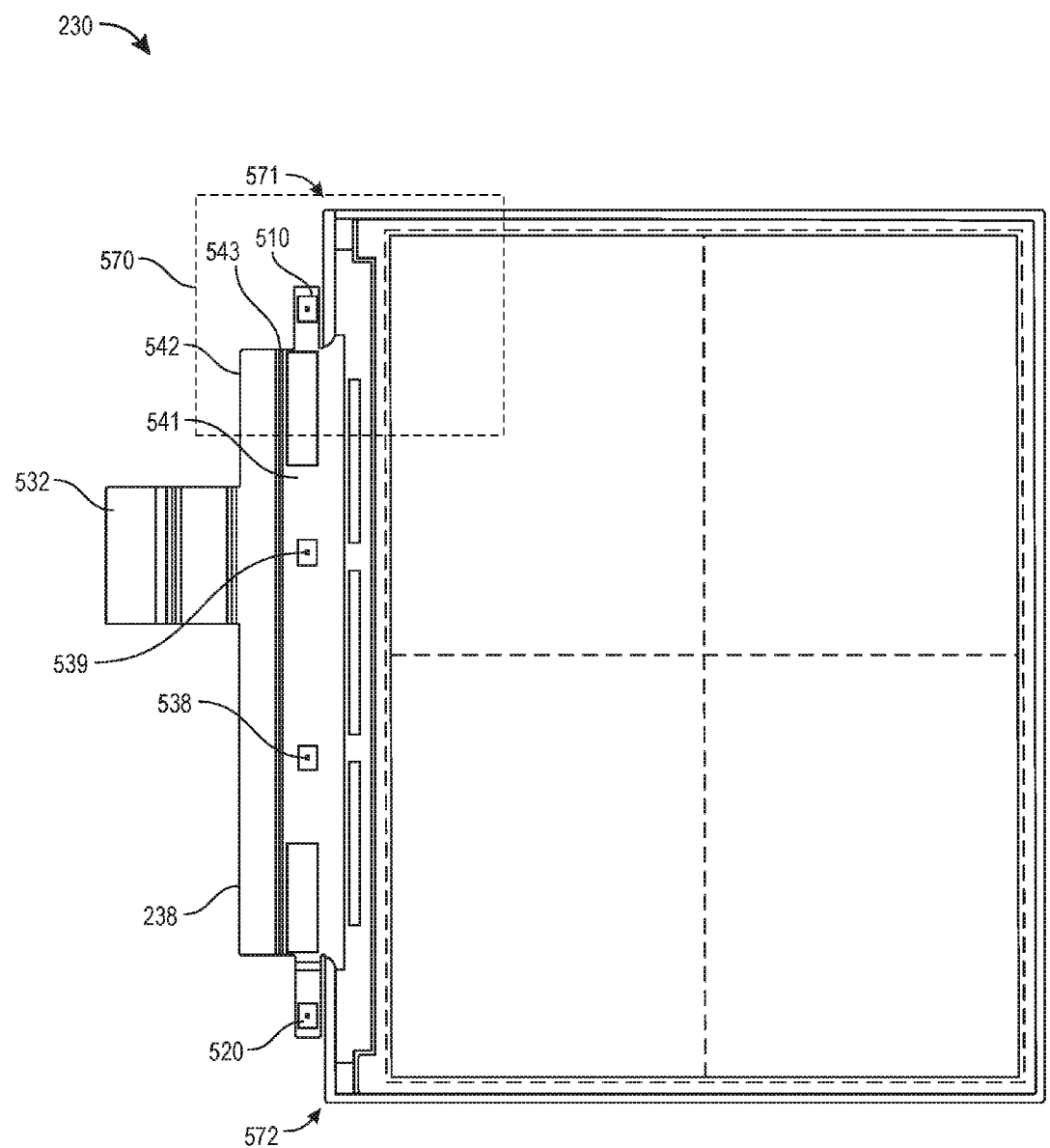
FIGS. 5A-5E illustrate an example display sub-assembly, in accordance with embodiments of the present invention.

FIGS. 5A-5D illustrate an example display sub-assembly 230, in accordance with embodiments of the present invention. FIG. 5A illustrates a front view of the display sub-assembly 230 comprising a display FPC 238. The display FPC 238 has a first display FPC portion 541, a second display FPC portion 542 coupled to the first display FPC portion 541 via a fold portion 543, and a display FPC tail 532 coupled to the second display FPC portion 542. The display FPC 238 may include a touch socket 510, to which the touch connector 219 may couple, and may comprise a light socket 520, to which the light connector 229 may couple. The display FPC 238 may also include a first dome switch 538 and a second dome switch 539. In an embodiment, the first button 108 may be positioned above the first dome switch 538, and when a user depresses the first button 108, the first dome switch 538 may be actuated via the depression. After actuation, the first dome switch 538 may include a spring to cause the button to return to a non-actuating position. In some embodiments, the first button 108 may comprise a material, such as rubber, that returns the first button 108 to the non-actuated position. It is to be understood that the dome switches 538-539 are a representative embodiment, and other suitable switch assemblies may be utilized.

In some embodiments, the electronic device 100 may have the display FPC 238 along a single edge of the electronic device. The display FPC 238 may have an upper end providing the touch socket 510. The display FPC 238 may have a lower end providing the light socket 520. The display FPC 238 may have a middle portion providing one or more dome switches 538-539. Such may be advantageous so that the touch socket 510, the light socket 520 and the dome switches 538-539 and corresponding buttons 108-109 do not overlap horizontally.

In some embodiments, the touch FPC 218 and the light FPC 228 may be provided with tolerance along the horizontal space or x-y space. For example, after the touch sub-assembly 210 is laminated to the cover glass 105, the light sub-assembly 220 is laminated to the touch sub-assembly 210, and the display sub-assembly 230 is laminated to the light sub-assembly 220, then the touch connector 219 may be coupled to the touch socket 510 and the light connector 229 may be coupled to the light socket 520. Laminating the stack assembly 103 prior to coupling the connectors 219, 229 to the sockets 510, 520 may be advantageous because the lamination of the sub-assemblies 210, 220, 230 may be visible to the user and thus may be important for user acceptance. To facilitate the coupling of the connectors 219, 229 to the sockets 510, 520, degrees of freedom may be applied to the touch connector 219 and the light connector 229 to facilitate the connection of such connectors coming from different laminations of the stack assembly 103 or component stack. Under some embodiments, tolerances, for example of hundreds of μm, along the horizontal space are accommodated. For example, a neck area of a connector may be utilized to absorb such tolerances. Such may be advantageous to provide compliant or flexible connectors 219,229 when coupling them to the sockets 510,520 in a slightly different position within the horizontal space.

Figure 5B:
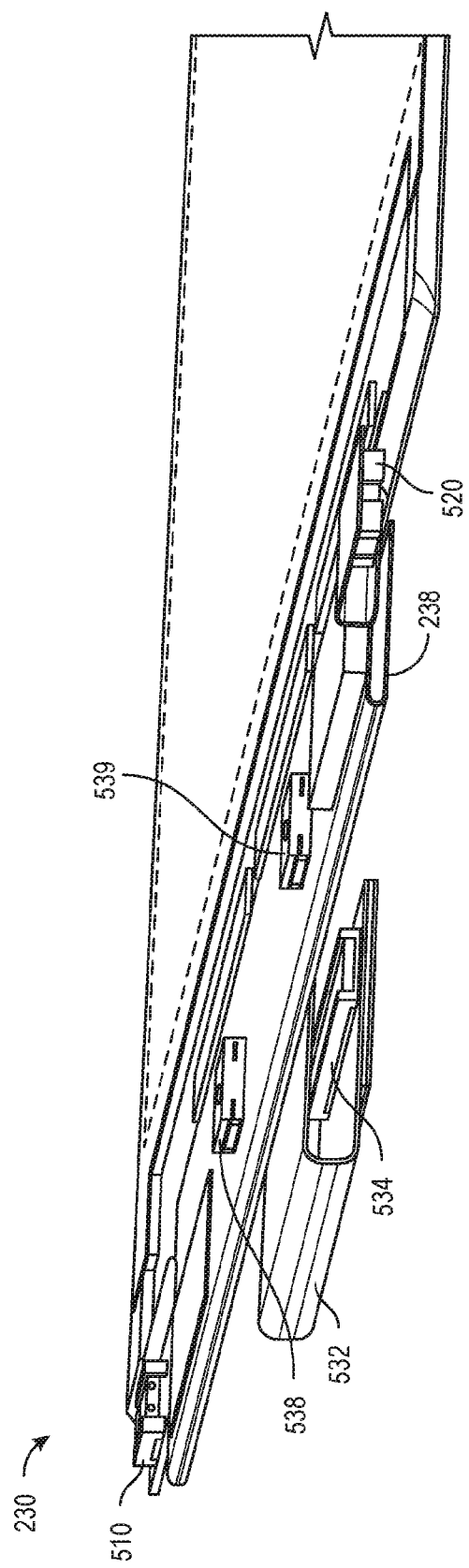

FIG. 5B illustrates a perspective view of the display sub-assembly 230 having a display FPC 238. The display FPC 238 may comprise a display FPC tail 532 having a display connector 534. Under some embodiments, a portion of the display FPC tail 532 may be adhered to an enclosure or frame of the electronic device 100. Although not shown, the display connector 534 may couple to a display socket of a mainboard module of the electronic device 100. The display FPC 238 may include the touch socket 510, the light socket 520, the first dome switch 538, and the second dome switch 539.

Figure 5C:
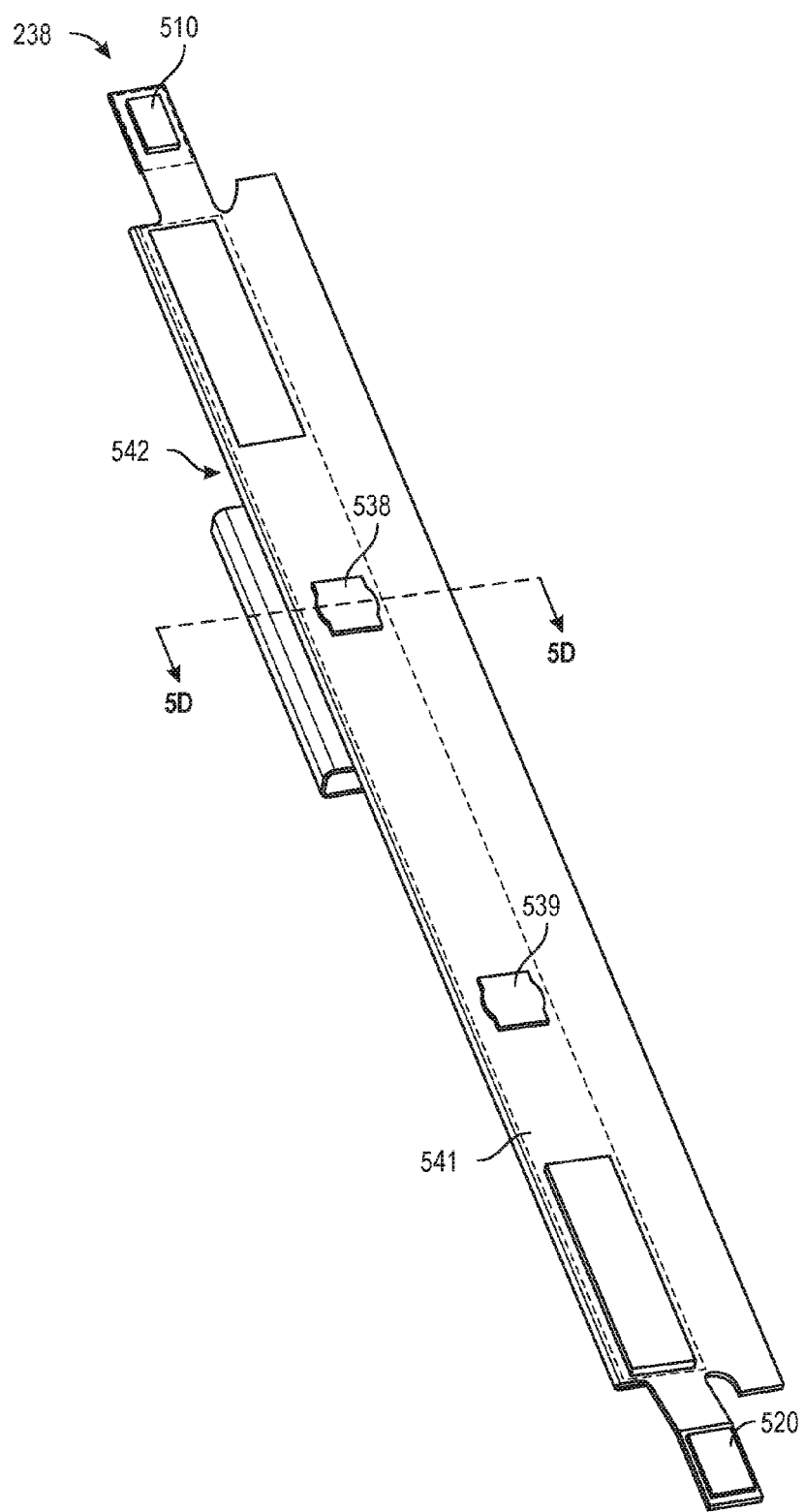

FIG. 5C illustrates a perspective view of the display FPC 238 of the display sub-assembly 230. The display FPC 238 may include a first display FPC portion 541 to which the first dome switch 538 and the second dome switch 539 may be coupled. Although not visible in FIG. 5C, the display FPC 238 may include the second display FPC portion 542 that may be folded underneath the first display FPC portion 541. The display FPC 238 may include the touch socket 510 and the light socket 520.

Figure 5D:
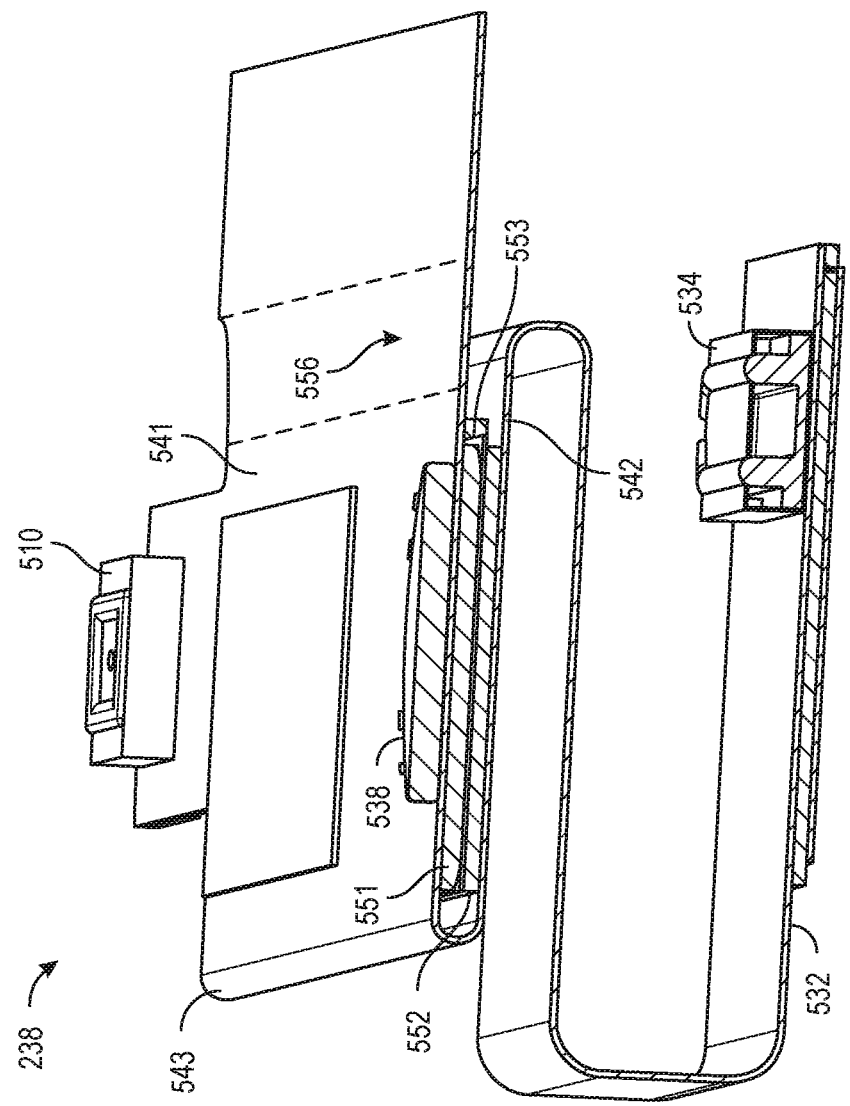

FIG. 5D illustrates a cross-sectional perspective view of the display FPC 238 taken at line 5D-5D shown in FIG. 5C. The display FPC 238 may include the first dome switch 538, which may be configured to be actuated by the first button 108. The first dome switch 538 may be coupled to the first display FPC portion 541 and the second display FPC portion 542 may be folded beneath the first display FPC portion 541 via the fold portion 543. In some embodiments, a first support structure 551 may be adhered to the first display FPC portion 541 with a thermally-activated adhesive or the like, and a second support structure 552 may be coupled to the second display FPC portion 542 with a thermally-activated adhesive or the like. The first support structure 551 may be adhered to the second support structure 552 with a support adhesive 553. The support structures 551-552 may comprise a stainless steel material or the like, which may be advantageous to provide support for a depression of the first button 108. For example, one or more support structures 551-552 may provide a thickness or stiffness that may prevent the display glass substrate 333 from breaking when the first button 108 is depressed by a user. Furthermore, one or more support structures 551-552 may transfer the force of the depression of the first button 108 via the support structures 551-552 to the enclosure or frame of the electronic device 100. It is to be understood that the above description of the first button 108 and the first dome switch 538 may also apply to the second button 109 and the second dome switch 539.

Under some embodiments, the display FPC 238 may have a flex portion 556. The flex portion 556 may allow the display FPC 238 to bend to accommodate the placement of the first button 108 on top of the first dome switch 538 and within the aperture 106. For example, the flex portion 556 may be a less stiff area allowing for a bend, such as by having a single layer of copper instead of multiple layers and not having vias in the flex portion 556. Such may be advantageous to allow insertion of the first button 108 after lamination of the stack assembly 103. In some embodiments, the first button 108 comprises a rubber material and is held in place through pressure from the display FPC 238 against the cover glass 105.

Figure 6:
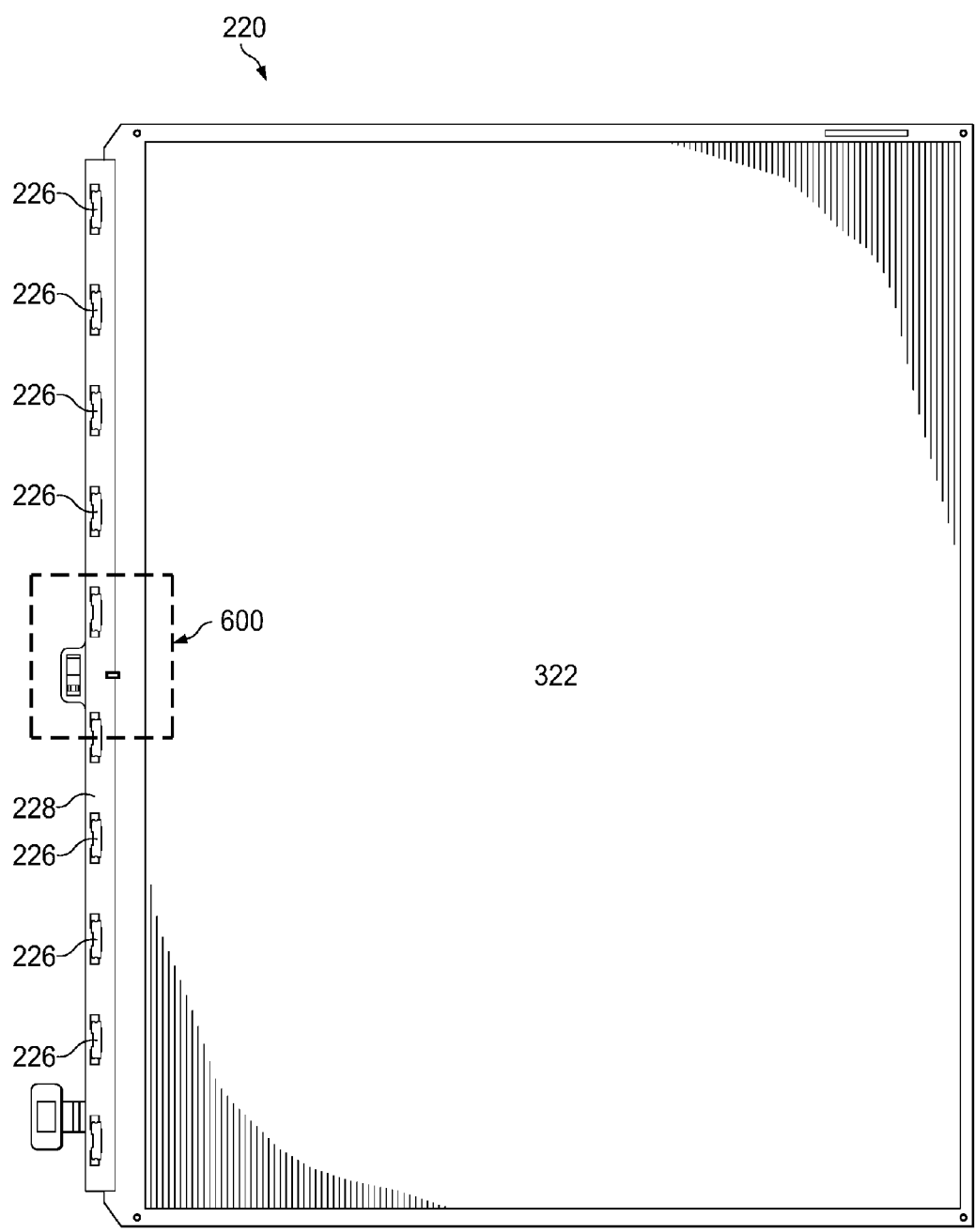
FIG. 6 is an example plan view of a light sub-assembly, in accordance with embodiments of the present invention.
Figure 7A:
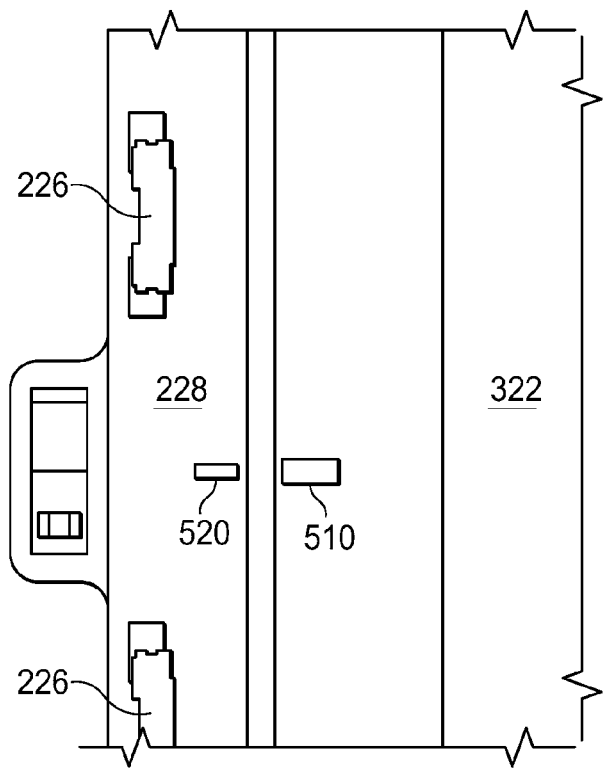
FIGS. 7A-7B are enlarged views of the light sub-assembly, in accordance with embodiments of the present invention.
Figure 7B:
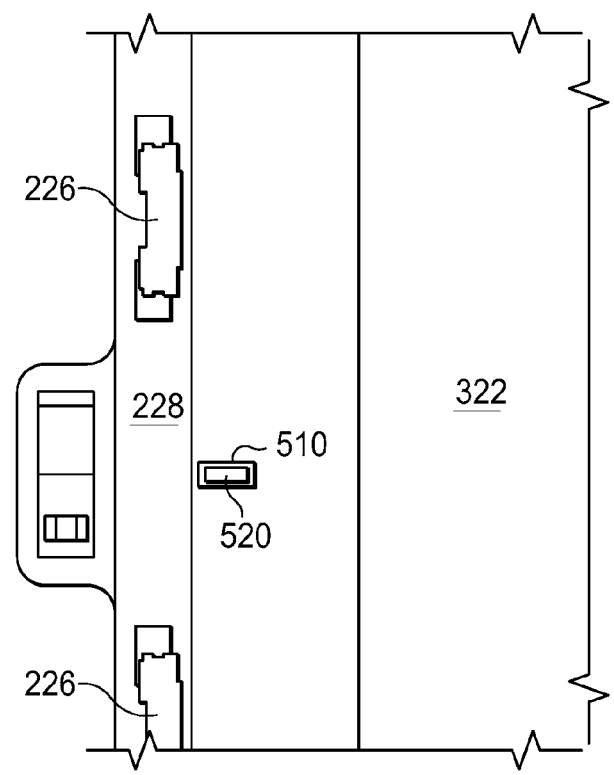

FIG. 6 is an example plan view of a light sub-assembly 220, in accordance with embodiments of the present invention. FIG. 7A is an enlarged view of the region 600 in FIG. 6 prior to alignment of the light guide 322 with the light FPC 228, and FIG. 7B is an enlarged view of the region 600 after alignment of the light guide 322 with the light FPC 228.

As described above, the light sub-assembly 220 may comprise a light FPC 228 onto which the LED light sources 226 are mounted, and the light guide 322 is formed with a pattern of optical surface features 512 to distribute light across the surface of the visible display area. In accordance with embodiments of the present invention, an optical alignment feature 511 is formed on the light guide 322 and a target fiducial 520 is formed on the light FPC 228. During the manufacturing process, the optical alignment feature 511 is aligned with the target fiducial 520 to enable precise alignment of the light FPC 228 with the light guide 322, and, more specifically, precise alignment of the pattern of optical surface features 512 with the LED light sources 226.

As described above, during the manufacturing of the light guide 322, a pattern of optical surface features 512 is formed on the light guide 322 for directing light from the light sources 226 to illuminate the display sub-assembly 230. These features, which may include grooves or gratings, can be formed using any of a variety of conventional methods, as would be understood by one of ordinary skill in the art. In accordance with embodiments of the present invention, the optical alignment feature 511 is formed at the same time as the other optical surface features, and may comprise, e.g., a rectangular pattern, groove, or recess. Because the optical alignment feature 511 is formed during the same process as the optical surface features, the positioning of the alignment feature 511 relative to the pattern of optical surface features 512 can be controlled with high precision. In addition, because the alignment feature 511 is positioned at approximately the midpoint along the long edge of the light guide 322, the impact of any shrinkage or other deformation of the light guide 322 after the formation of the alignment feature 511 on the alignment of the light guide 322 and the light FPC 228 will be minimized.

As described above, a plurality of LED light sources 226 is coupled to the light FPC 228. During the manufacturing process of the light FPC 228, a plurality of electrical contacts 522 is formed on the surface of the light FPC 228. The LED light sources 226 are coupled to these electrical contacts 522 to provide electrical connectivity between the LED light sources 226 and the light FPC 228. These electrical contacts 522 may be formed in any of the variety of conventional ways, as would be understood by one of ordinary skill in the art. For example, the electrical contacts 522 may comprise copper pads plated with gold, which are formed on the light FPC 228 using mask and etching processes. In accordance with embodiments of the present invention, the target fiducial 520 also comprises a copper pad, optionally plated with gold, and is formed on the display FPC 228 at the same time and during the same process steps as the electrical contacts 522. Because the target fiducial 520 is formed using the same mask and etching steps as the electrical contacts 522, the positioning of the target fiducial 520 relative to the electrical contacts 522 can be controlled with high precision. As a result, after the LED light sources 226 are coupled to the electrical contacts 522, the LED light sources 226 will then be positioned relative to the target fiducial 520 with high precision.

FIG. 7A shows the light guide 322 in the process of being aligned with the light FPC 228, and FIG. 7B shows the light guide 322 aligned with the light FPC 228. Because the light guide 322 is transparent, a machine vision camera may be used to view the target fiducial 520 through the optical alignment feature 511 and precisely align the light guide 322 with the light FPC 228 before coupling the two components together. Because of the high precision with which the target fiducial 520 and optical alignment feature 511 are formed, after coupling of the light guide 322 with the light FPC 228, the LED light sources 226 will be aligned with the pattern of optical surface features 512 on the light guide 322 with high precision as well.

Figure 8A:
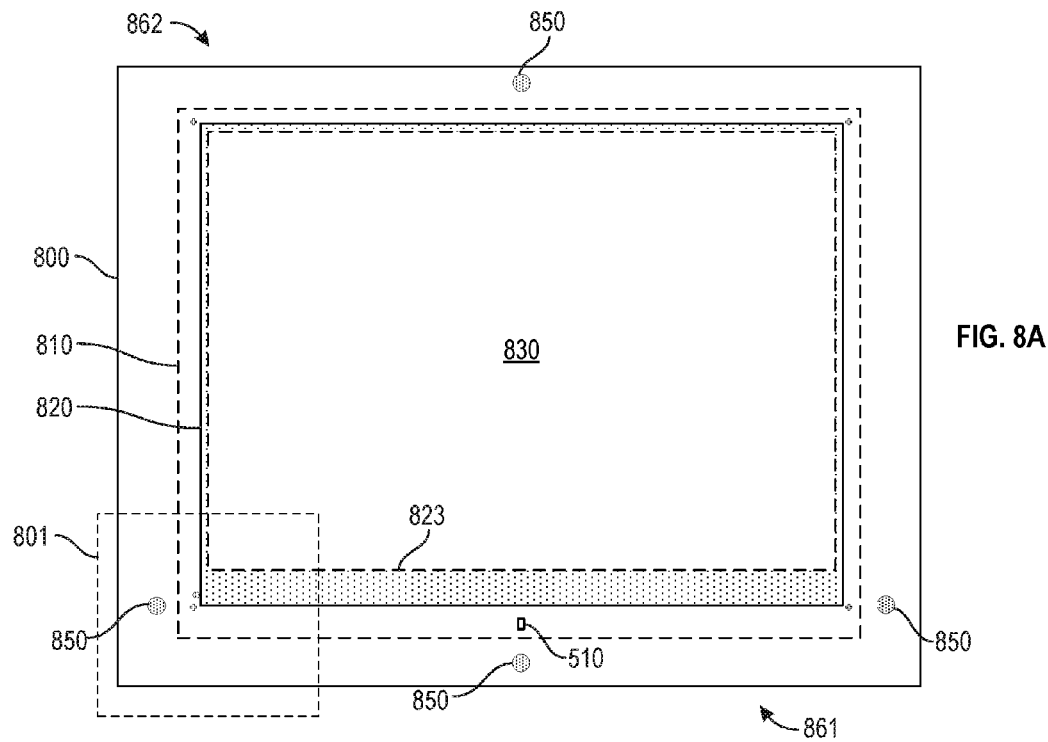
FIGS. 8A-8B are plan views of a light guide, in accordance with embodiments of the present invention.
Figure 8B:
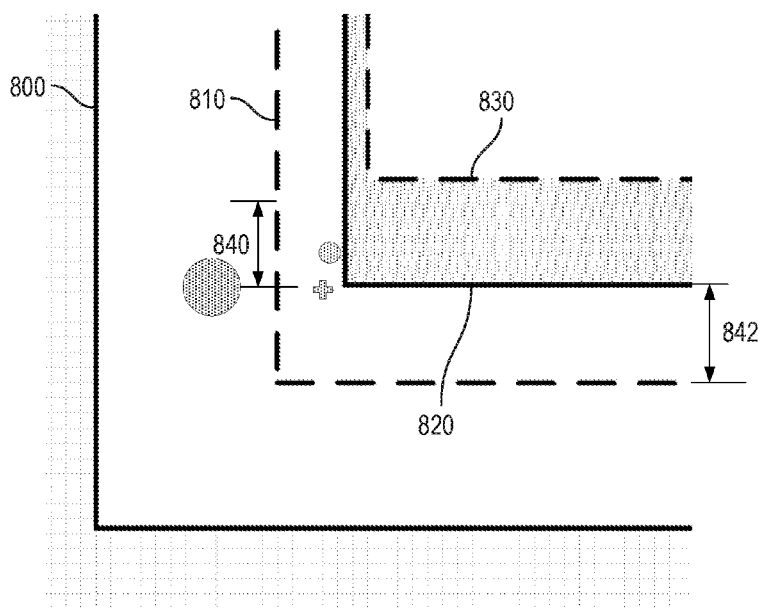

FIGS. 8A-8B are plan views of a light guide 322, with FIG. 8B showing an enlarged view of the region 801 shown in FIG. 8A. During the manufacturing of the light guide 322, after the pattern of optical surface features 512 ise formed, the light guide 322 is die cut or otherwise separated from a larger sheet of material 800 forming the light guide 322. FIGS. 8A-8B show the larger sheet of material 800, from which the light guide 322 is cut, and also show the cut line 810, where the light guide 322 is separated from the rest of the material 800. As also shown in FIGS. 8A-8B, the region 820 in which the pattern of optical surface features 512 is formed is slightly larger than the region 830 of the visible display area 823 in which the user can view images displayed by the device 100. This ensures that the light from the multiple LED light sources 226 can be effectively dispersed across the surface of the visible display area 823 without overly bright or dim regions. In the illustrated embodiment, this separation distance 840 is approximately 2 mm.

In accordance with embodiments of the light guide, one or more fiducial marks 850 are formed on the material 800 forming the light guide 322 for the purpose of aligning the light guide for die cutting. These fiducial marks 850 are nearest to the edge 861, which will be aligned with the light FPC 228 and are used to align the material 800 for die cutting along cut line 810 to separate the light guide 322 from the rest of the material 800. As a result, the distance 842 from the cut line 810 to the edge of the region 820 can be closely controlled. Any shrinkage or other deformation of the light guide 322 will have a greater impact on the far edge 862 than on the edge 861, which will be aligned with the LED light sources 226 in the light FPC 228.

In accordance with embodiments of the present invention, one or more stiffener members may be coupled to the light FPC 228 to provide increased rigidity and to improve the ease of handling of the light FPC 228 during manufacturing. It is generally desirable to minimize any movement of misalignment of the light sources 226 with the light guide 322. When a flexible circuit is used for the light FPC 228, the light FPC 228 is potentially susceptible to bending, warping, or other deformation that could cause one or more of the light sources 226 to be improperly positioned. In some embodiments, the light FPC 228 is adhered to the light guide 322 on one side, but is unsupported on the opposite side facing the display sub-assembly 230. As a result, the light FPC 228 is at even greater risk of misalignment. Moreover, the handling of a flexible member such as the light FPC 228 can increase the complexity and difficulty of the manufacturing process, thereby increasing the risk of defects and the cost of manufacturing. The use of one or more stiffener members for the light FPC 228 can decrease the risk of misalignment, as well as the risk of defects and cost of manufacturing.

As shown in FIG. 1, a stiffener member 180 is coupled to the side of the light FPC 228 opposite the light guide 322. The stiffener member 180 may be made of any suitable material providing the desired degree of rigidity and strength, such as metal or plastic, and adhered to the light FPC 228 using any suitable adhesive material, such as, for example, a PSA layer 182. In one embodiment, light FPC 228 has a thickness of approximately 100 μm, and the stiffener member 180 comprises a sheet of rigid polyimide having a thickness of approximately 50 μm. The stiffener member 180 may be applied to the light FPC 228 in a batch process, wherein an extended length of stiffener material is adhered to an extended length of FPC material using an extended length of PSA material, and that laminated structure is singulated into multiple light FPCs 228.

In accordance with some embodiments of the present invention, a second sacrificial stiffener member 190 is coupled to the light FPC 228 to provide additional rigidity and planarity to the light FPC 228 before the light FPC 228 is attached to the light guide 322. Even when a first stiffener member 180 is used to increase the rigidity of the light FPC 228, space constraints within the device 100 can limit the thickness of the material used for the first stiffener member 180. As a result, the combined first stiffener member 180 and light FPC 228 may still undesirably bend before attachment to the light guide 322. Accordingly, the sacrificial stiffener member 190 may be temporarily coupled to the light FPC 228 (optionally with the first stiffener member 180 disposed therebetween), to further increase the rigidity of the combined component. After the light FPC 228 is attached to the light guide 322, the adhesive coupling the light FPC 228 to the rigid light guide 322 will maintain the desired shape for the light FPC 228 and alignment of the LED light sources 226. Therefore, the sacrificial stiffener member 190 may be removed so as to not consume any space inside the device 100. In the embodiment illustrated in FIG. 1, the sacrificial stiffener member 190 comprises a PET material having a thickness of, for example, between about 50 μm to about 200 μm, and, more preferably, approximately the same thickness of the light FPC 228 and stiffener member 180 assembly, e.g., approximately 150 μm. The sacrificial stiffener member 190 is coupled to the side of the first stiffener member 180 opposite the light FPC 228 using any suitable adhesive. Because the sacrificial stiffener member 190 will only be adhered to the first stiffener member 180 for a temporary period of time, a very weak adhesive may be used so as to enable easy removal of the sacrificial stiffener member 190 without causing damage to any other structures. By removing the sacrificial stiffener member 190 before completing the manufacturing of the stack assembly 103, the overall thickness of the completed stack assembly 103 may be reduced as compared to a device in which a thick stiffener member is permanently attached to the light FPC 228.

Manufacturing Process

Figure 9:
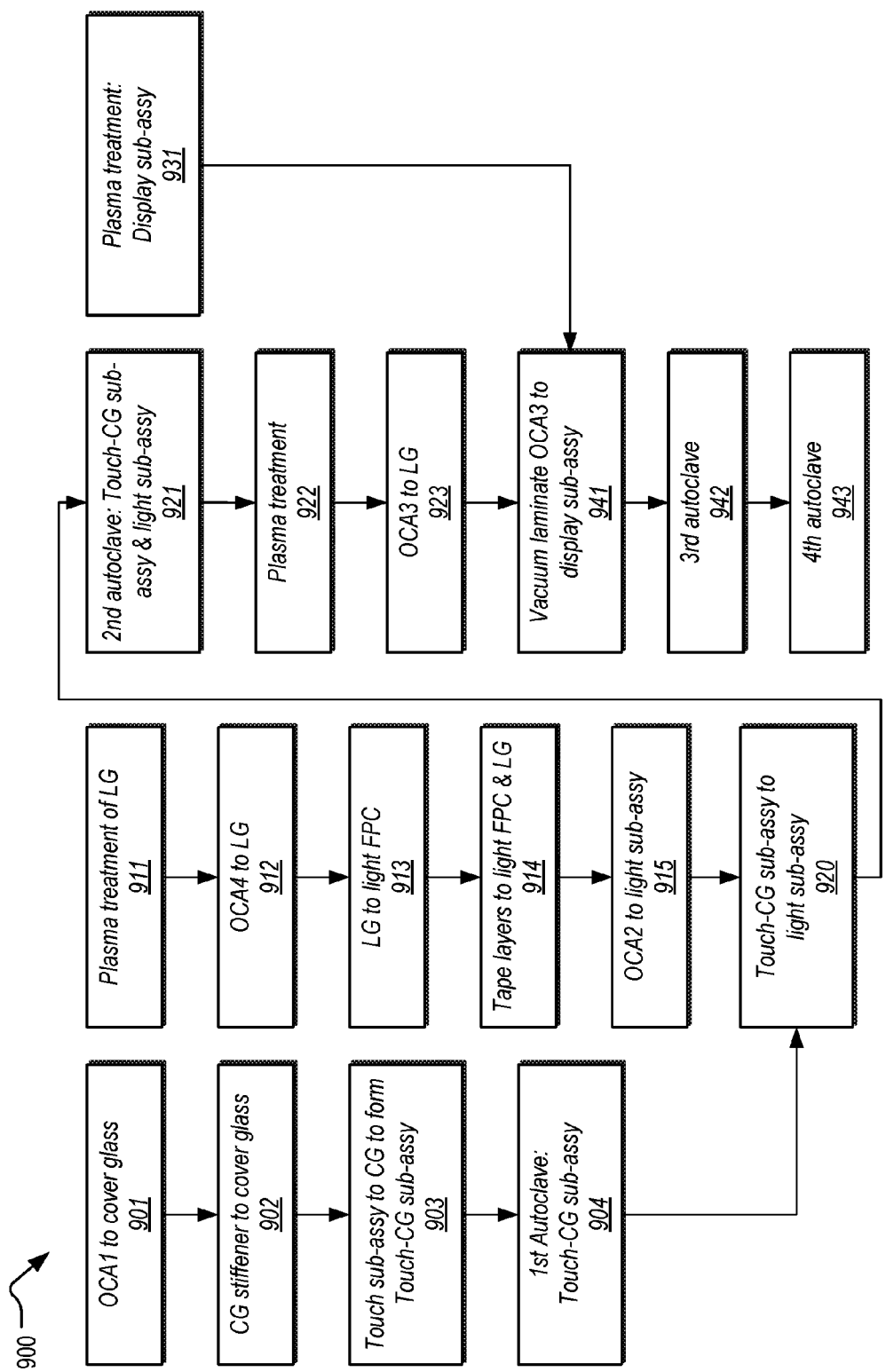
FIG. 9 is a flowchart of a stack assembly manufacturing process, in accordance with embodiments of the present invention.

FIG. 9 is a flowchart of a stack assembly manufacturing process 900 and FIGS. 10A-10M are example schematic cross-sectional views of a stack assembly being assembled pursuant to the manufacturing process 900, in accordance with embodiments of the present invention.

Figure 10A:
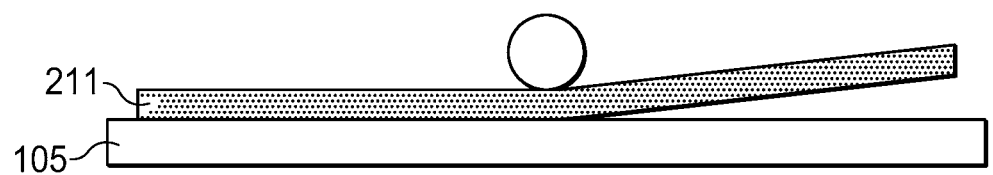
FIGS. 10A-10M are example schematic cross-sectional views of a stack assembly manufacturing process, in accordance with embodiments of the present invention.

In step 901, shown in FIG. 10A, OCA1 layer 211 is applied to the cover glass 105 using, for example, a roll lamination process. During this process, one edge of the OCA1 layer 211 is aligned with an edge of the display mask 125.

Figure 10B:
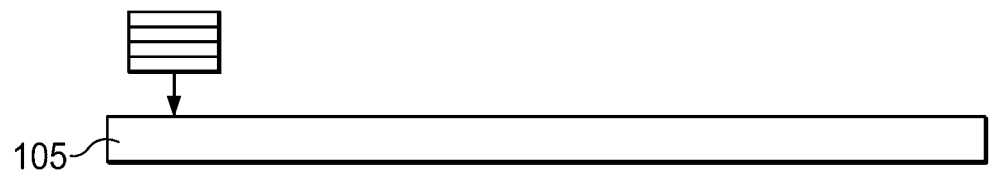

In step 902, shown in FIG. 10B, a cover glass support structure 1110 (shown in FIG. 11) is coupled with the cover glass 105 to surround the apertures 106-107 to provide increased strength to the regions of the cover glass 105 surrounding the page-turn buttons 108-109. The cover glass support structure 1110 may be made of any suitable material providing the desired characteristics, such as, e.g., stainless steel.

Figure 10C:
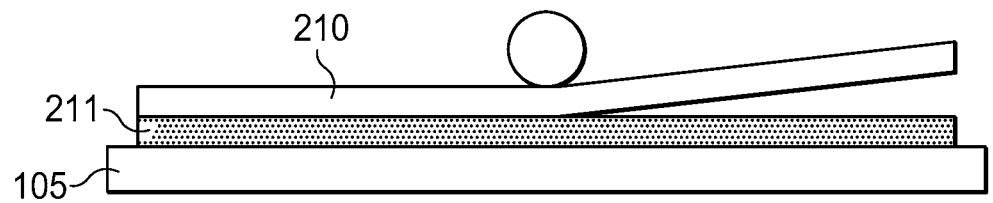

In step 903, shown in FIG. 10C, the touch sub-assembly 210 is coupled to the cover glass 105 with the OCA1 layer 211 to form a touch-CG sub-assembly. The touch sub-assembly 210 may be attached to the OCA1 layer 211 using, for example, a roll lamination process.

In step 904, a first autoclave process is performed on the touch-CG sub-assembly. The first autoclave process may be performed, for example, at a temperature of at least about 40° C. and a pressure of at least about 5.5 kgf/cm$^2$ for a period of 15 minutes. It is believed that the high temperature softens the OCA1 layer 211 so that it is more responsive to the high pressure to remove any air bubbles that may have been trapped between the OCA1 layer 211 and the cover glass 105 and touch sub-assembly 210.

Figure 10D:
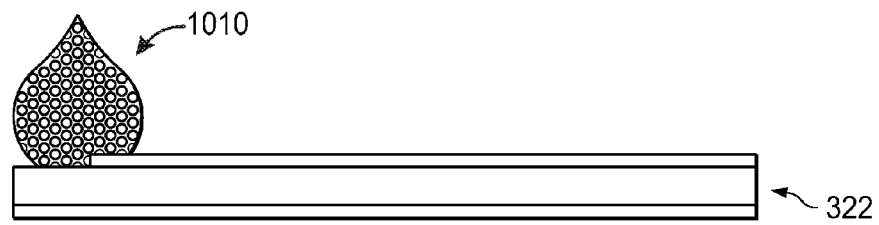

In step 911, shown in FIG. 10D, the side of the light guide 322 to be adhered to the OCA4 layer 227 is subjected to a plasma treatment process. The plasma treatment process in step 911 is performed to improve the adhesion between the light guide 322 and the OCA4 layer 227 and may be performed serially or in parallel with steps 901-904. In the illustrated embodiment, the plasma treatment process is performed at atmospheric pressure using argon plasma 1010 at a power of approximately 350 W.

Figure 10E:
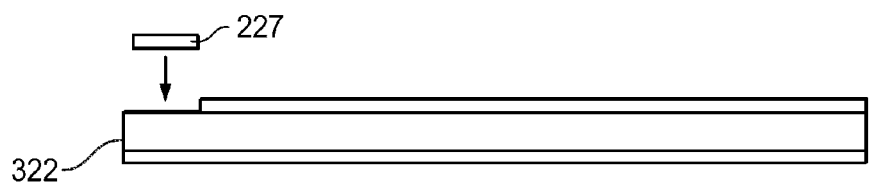

In step 912, shown in FIG. 10E, a fourth OCA (OCA4) layer is applied to a portion of the light guide 322 that will be attached to the light FPC 228.

Figure 10F:

In step 913, shown in FIG. 10F, the light guide 322 is coupled with the light FPC 228 with the OCA4 layer. In this step, the optical alignment feature 511 on the light guide 322 is aligned with the target fiducial 520 on the light FPC 228 using an overhead camera assembly, and the light guide 322 is attached to the light FPC 228 using a vertical press fixture which provides a uniform pressure across the entire area covered by the OCA4 layer.

Figure 10G:
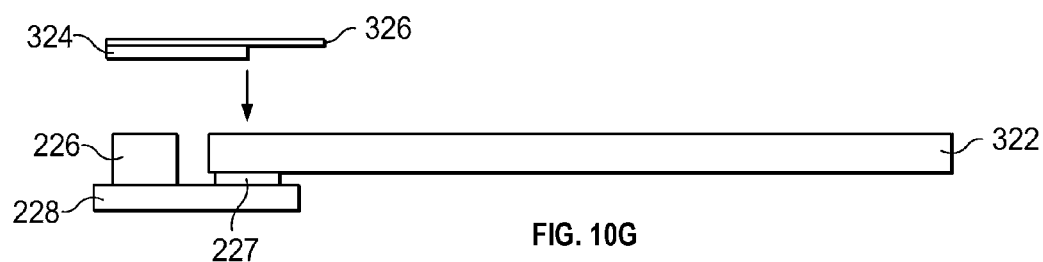

In step 914, shown in FIG. 10G, the first tape layer 324 and second tape layer 326 are applied to the light guide 322 and light sources 226. In some embodiments, the first tape layer 324 and second tape layer 326 are attached together before being applied to the light guide 322 and light sources 226. In other embodiments, the first tape layer 324 is applied to the light guide 322 and light sources 226 first, and then the second tape layer 326 is applied over the first tape layer 324 and light guide 322.

Figure 10H:
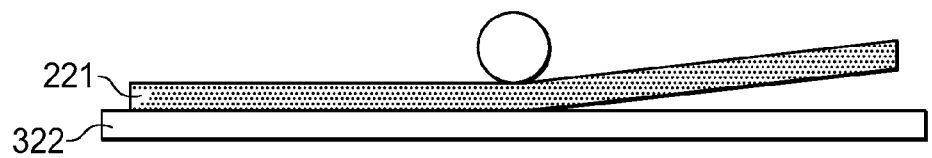

In step 915, shown in FIG. 10H, OCA2 layer 221 is applied to the light sub-assembly 220 using, for example, a roll lamination process. The OCA2 layer 221 may comprise an acrylic material or the like, having a thickness of, for example, about 150 μm. It may be desirable for the OCA2 layer 221 to be sufficiently flexible as to withstand the stresses caused by the expansion and warping of the two surfaces to which the OCA2 layer 221 is adhered. Examples of suitable materials for OCA2 layer 221 include part numbers 8266, 8146-6, and 2906 from 3M Company of St. Paul, Minn. and part number TE7060 from Hitachi, Ltd. of Japan.

Figure 10I:
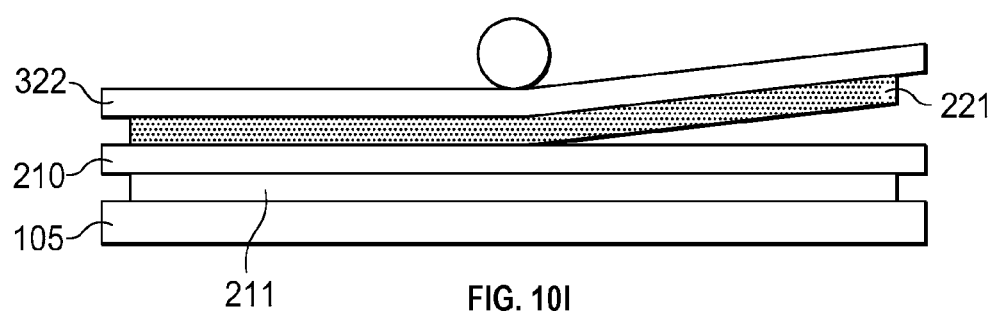

In step 920, shown in FIG. 10I, the touch-CG sub-assembly is coupled to the light sub-assembly 220 with the OCA2 layer 221 using, for example, a roll lamination process.

In step 921, a second autoclave process is performed on the laminate formed by the touch-CG sub-assembly coupled to the light sub-assembly 220. In some embodiments, the second autoclave process may be performed with the same parameters as the first autoclave process, but is performed after the first autoclave process. This period of time may be, for example, approximately one hour. In other embodiments, the second autoclave process may be performed at a different temperature than the first autoclave process, such as, for example, a higher temperature of approximately 60° C. at a pressure of 5.5 kgf/cm$^2$ for a period of 15 minutes.

Figure 10J:
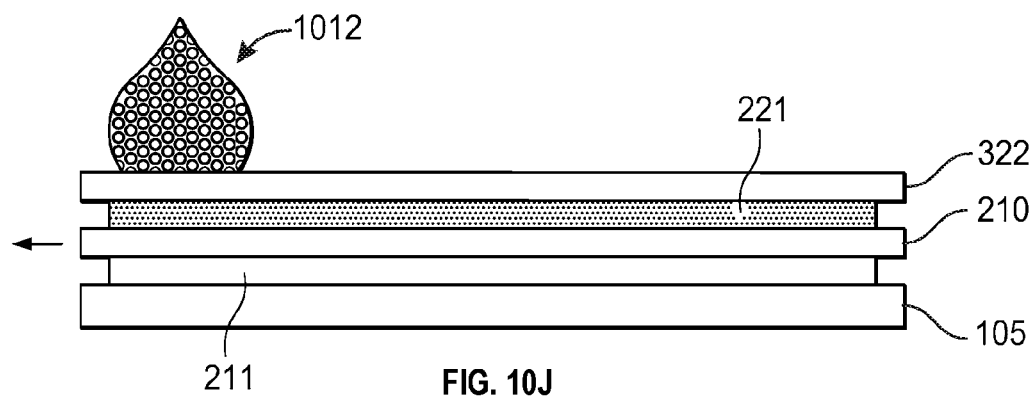

In step 922, shown in FIG. 10J, the side of the light guide 322 to be adhered to the OCA3 layer 222 is subjected to a second plasma treatment process. The second plasma treatment process in step 922 is performed to improve the adhesion between the light guide 322 and the OCA3 layer 222. In the illustrated embodiment, the plasma treatment process is performed at atmospheric pressure using nitrogen plasma 1012 at a power of approximately 900 W.

Figure 10K:
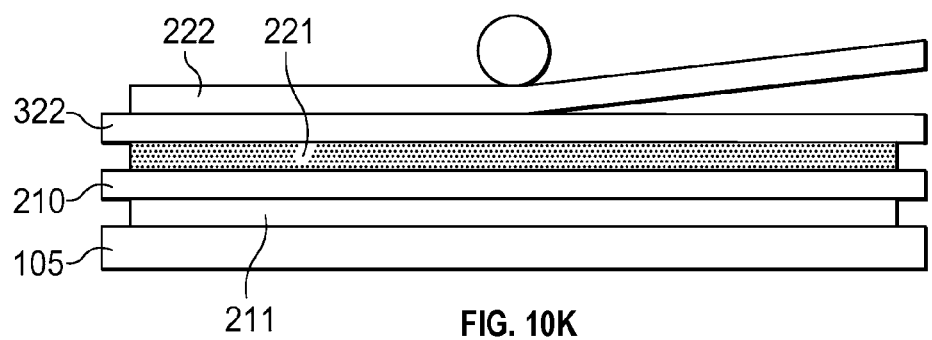

In step 923, shown in FIG. 10K, the OCA3 layer 222 is applied to the side of the light guide 322 subjected to the second plasma treatment process in step 922 using, for example, a roll lamination process.

Figure 10L:
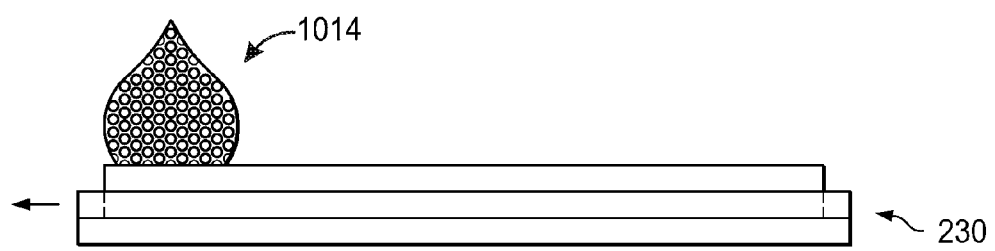

In step 931, shown in FIG. 10L, the side of the display sub-assembly 230 to be adhered to the OCA3 layer 222 is subjected to a third plasma treatment process. The third plasma treatment process in step 931 is performed to improve the adhesion between the display sub-assembly 230 and the OCA3 layer 222 and may be performed serially or in parallel with steps 920-923. In the illustrated embodiment, the plasma treatment process is performed at atmospheric pressure using nitrogen plasma 1014 at a power of approximately 900 W.

Figure 10M:
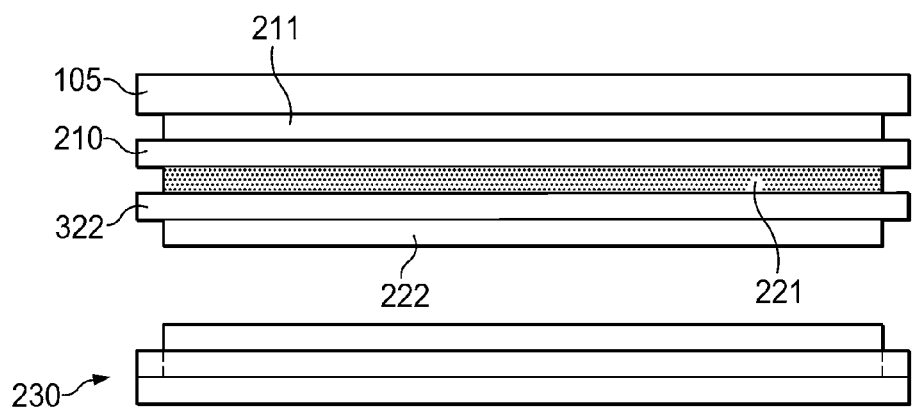

In step 941, shown in FIG. 10M, the display sub-assembly 230 is attached to the OCA3 layer 222 using, for example, a roll lamination process or a vacuum lamination process.

In step 942, a third autoclave process is performed on the assembly formed in step 941. In some embodiments, the third autoclave process may be performed with the same parameters as the first autoclave process, such as, for example, at a temperature of 40° C. and a pressure of 5.5 kgf/cm$^2$ for a period of 15 minutes.

In step 943, a fourth autoclave process is performed on the assembly formed in step 941. In some embodiments, the fourth autoclave process may be performed with the same parameters as the third autoclave process, but is performed after a period of time has elapsed since the third autoclave process. This period of time may be, for example, approximately one hour. In other embodiments, the fourth autoclave process may be performed at a different temperature than the first autoclave process, such as, for example, a higher temperature of approximately 60° C. at a pressure of 5.5 kgf/cm$^2$ for a period of 30 minutes.

The various roll lamination processes described herein may be performed using a single laminating roller or a pair of laminating rollers. The use of a pair of rollers may be more desirable when laminating two flexible structures, while the use of a single roller and a rigid base may be more desirable when laminating a rigid structure to a flexible structure. Roll lamination technologies are generally well known by those of ordinary skill in the art and, consequently, are not described in detail herein.

EPD Edge Sealing

In the embodiment shown in FIG. 1, the display sub-assembly 230 comprises a display plastic sheet 334, a display glass substrate 333, an EPD layer 332, and a display plastic film 331. In EPD devices, such as EPD layer 332, the active material contained within the EPD layer which produces the black and white images is extremely sensitive to moisture. As a result, when the active material extends to one or more of the edges of the EPD layer, the edges of the EPD layer are typically sealed with a moisture barrier coating to prevent damage to the active material along those edges.

Figure 5E:
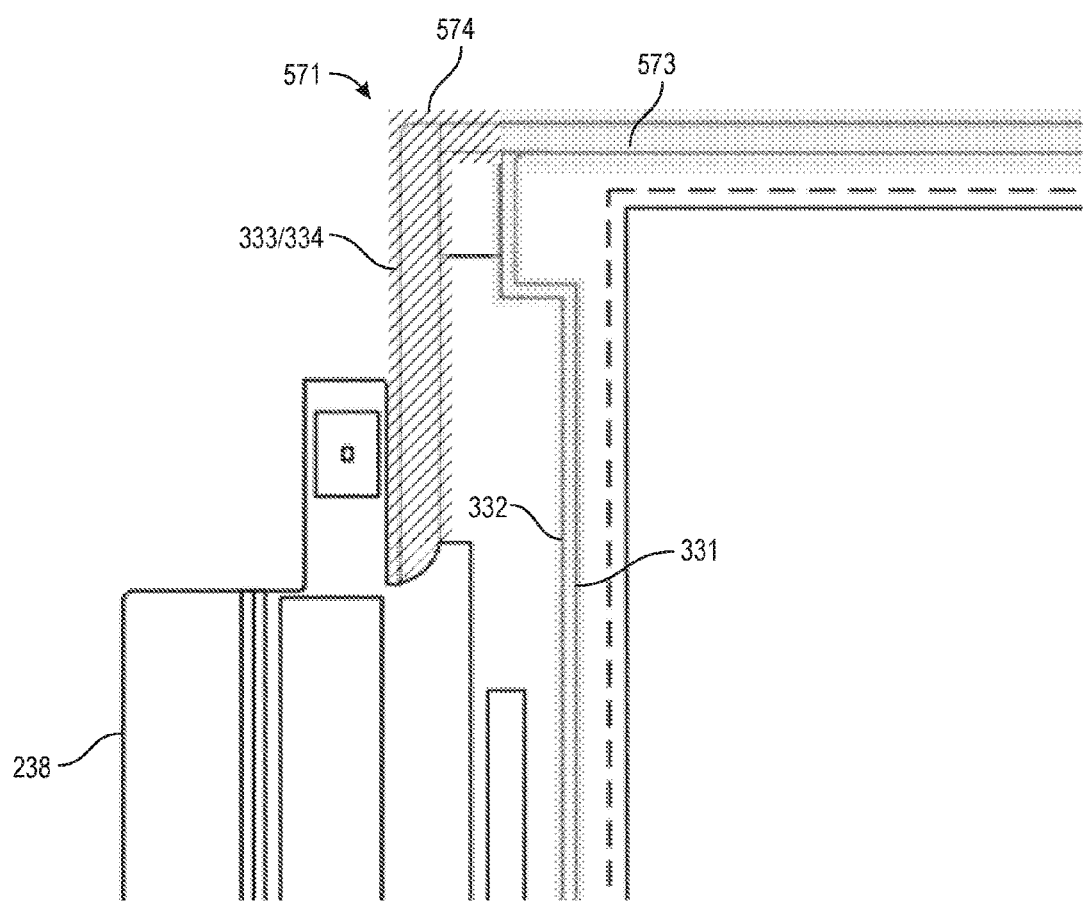

FIG. 5E is an enlarged view of the region 570 in FIG. 5A. As can be seen in FIG. 5A, in some portions of the display sub-assembly 230, such as corner region 571, the EPD layer 332 does not extend completely to the edge of the display plastic sheet 334 and display glass substrate 333. This is to provide a surface on the glass substrate 33 closest to the display FPC 238 onto which the display FPC 238 may be attached. Because this corner region 571 does not include an edge of the EPP layer 332 which needs to be moisture sealed, it is unnecessary to apply a moisture barrier coating to the corner region 571. In accordance with embodiments of the present invention, two different sealing materials may be applied to the edges of display sub-assembly 230.

In accordance with embodiments of the present invention, a first sealing material 573 for preventing moisture entry into the EPD layer 332 is formed using an edge cure (EC) process, similar to conventional methods of sealing EPD layers. This first sealing material 573 is formed along all sides of the EPD layer 332, but not at the corner region 571 closest to the display FPC 238 and the corresponding corner region 572 at the distal end of the display FPC 238 (shown in FIG. 5A). Because these corner regions 571-572, are not sensitive to moisture entry, a moisture sealing barrier is not needed. In addition, because the EC sealing material 573 is typically fairly brittle, if the sealing material 573 were deposited on the corner regions 571-572, they would be more susceptible to cracking or other damage, because of the higher likelihood that the corner regions 571-572 will be subjected to an undesirable impact during handling. Accordingly, at those two corner regions 571-572, a second sealing material 574 comprising a room temperature vulcanized (RTV) silicone is applied. This second sealing material 574 may comprise, e.g., a silicone layer, which provides cushioning and protection for the corner regions 571-572 of the glass substrate 333. Because of the importance of the moisture seal on the EPD layer 332, the first sealing material 573 is deposited first to ensure that all moisture-sensitive regions are sealed. Next, the second sealing material 574 may be deposited, in some cases overlapping the first sealing material 573.

Grounding Clip

Figure 11:
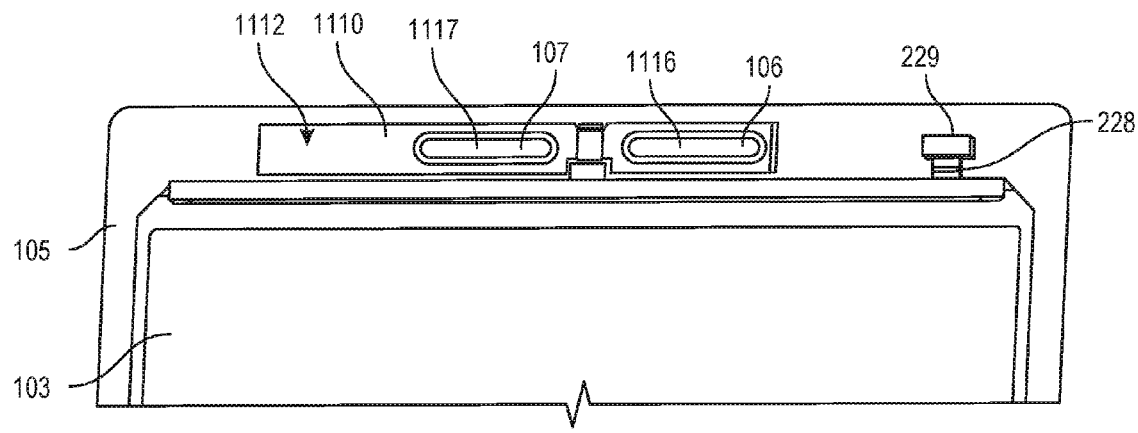
FIG. 11 illustrates a back view of a portion of a stack assembly and cover glass, in accordance with embodiments of the present invention.

FIG. 11 illustrates a back view of a portion of a stack assembly and cover glass, in accordance with embodiments of the present invention. As illustrated in FIG. 11, a cover glass 105 may comprise a first aperture 106 and a second aperture 107, through which two respective buttons 108-109 may be inserted. Although a portion of the display stack 103 is illustrated in FIG. 11, the display FPC 238 and the touch FPC 218 are not depicted, but the light connector 229 of the light FPC 228 is depicted.

Under some embodiments, the first button 108 may be positioned within the first aperture 106, and the first button 108 may be actuated by pressing the first button 108 such as with a finger press. To accommodate such positioning and such actuation, there may be a gap or a space between a portion of the cover glass 105 surrounding the first aperture 106 and other components of the stack assembly 103, such as the display FPC 238. Such a gap or a space may increase the risk of breakage of the cover glass 105, such as during reliability testing of repeated actuations of the first button 108. A cover glass support structure 1110 may be advantageously adhered or coupled to the back surface of the cover glass 105 in the region of the apertures 106-107. A cover glass support structure 1110 may comprise, for example, a planar plate, such as a thin, flat sheet or piece of metal or other material, of approximately uniform thickness. In some embodiments, the stack assembly 103 may be coupled to a first portion of the back surface of the cover glass 105, and the support structure 1110 may be coupled to a second portion of the back surface of the cover glass 105. The cover glass support structure 1110 may comprise a glass stiffening material such as a stainless steel material or the like. The cover glass support structure 1110 may comprise a first support aperture 1116 that has a dimension of a width and length that is approximately equivalent to the width and length of the first aperture 106 of the cover glass 105. Such a dimension allows for the placement of the cover glass support structure 1110 in relation to the cover glass 105 to align the first support aperture 1116 with the first aperture 106 such that the first button 108 may be placed within the first support aperture 1116 and the first aperture 106. The cover glass support structure 1110 may be beneficial to provide structural support, strength, or stiffening for the cover glass 105 in the region surrounding the first aperture 106. Such structural support, strength, or stiffening may reduce breakage of the cover glass 105, for example, from repetitive actuation of the first button 108. It is to be understood that the above description of the first button 108, the first aperture 106, and the first support aperture 1116 may also apply to the second button 109, the second aperture 107, and a second support aperture 1117.

Under some embodiments, the cover glass support structure 1110 may comprise an electrically conductive material such as the stainless steel material described above. An electrically conductive material may be advantageous in order to provide a grounding that may diffuse electric static discharge. Under this embodiment, the cover glass support structure 1110 may have a support structure grounding portion 1112 that may extend along an edge of the cover glass 105.

Figure 12:
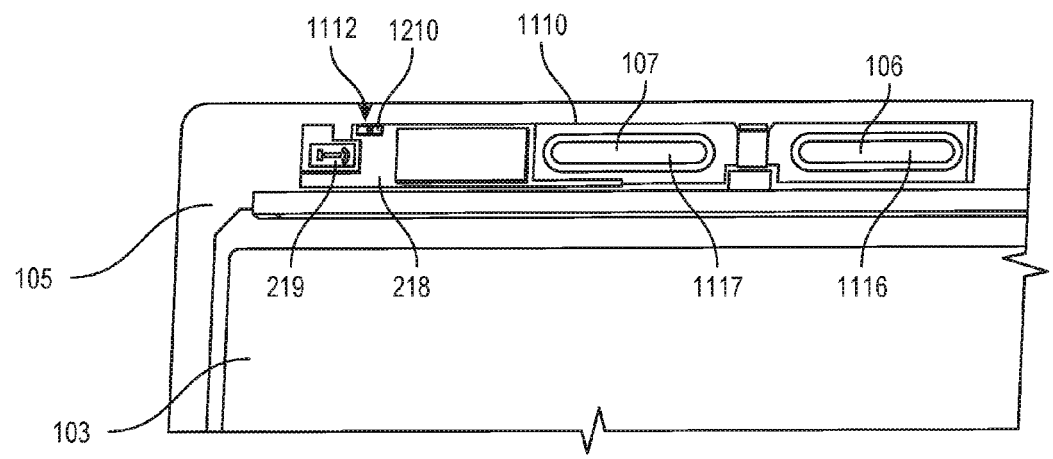
FIG. 12 illustrates a back view of a portion of a stack assembly and a cover glass, in accordance with embodiments of the present invention.

FIG. 12 illustrates a back view of a portion of a stack assembly and a cover glass, in accordance with embodiments of the present invention. The illustration of FIG. 12 is similar to the illustration of FIG. 11, with the primary difference being the depiction of the touch FPC 218 positioned generally proximate to the support structure grounding portion 1112. The touch FPC 218 may comprise the touch connector 219 and a grounding clip 1210. Under some embodiments, a ground path between the cover glass support structure 1110 and a frame 1110 of the electronic device 100 may be via at least the grounding clip 1210, as described below. The grounding clip 1210 may comprise an electrically conductive material, such as a metal alloy.

Figure 13:
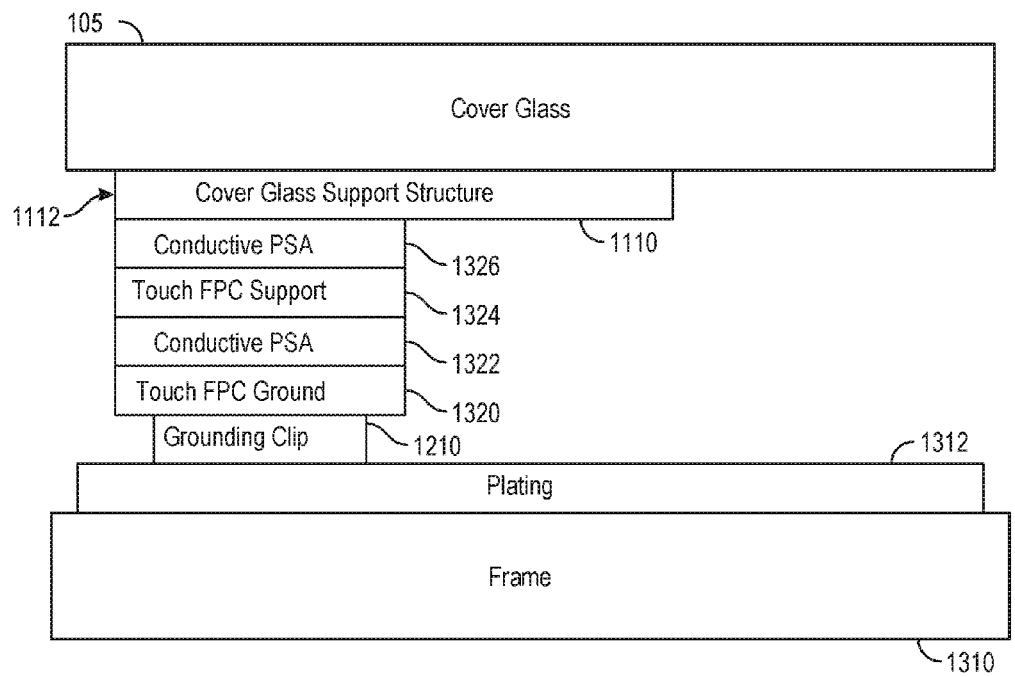
FIG. 13 illustrates an example schematic cross section of a ground path, in accordance with embodiments of the present invention.

FIG. 13 illustrates an example schematic cross section of a ground path, in accordance with embodiments of the present invention. As illustrated, the grounding clip 1210 may be electrically coupled to the frame 1310. It is to be understood that the frame 1310 may be a chassis, a housing, or the like. Under some embodiments, the frame 1310 may comprise a base plastic material or the like, and the frame 1310 may have an inner surface that may comprise a metal plating 1312, a conductive nickel plating, or the like that is plated on top of the base plastic material. The metal plating 1312 may serve as a grounding layer or a grounding plane of the frame 1310. Examples of the metal plating 1312 are nanocrystalline metal or Nanovate metal from Integran Technologies Inc. of Mississauga, Canada. Although not depicted, under other embodiments, the frame 1310 may be comprised substantially of metal alloy, such as magnesium alloy or aluminum alloy, which may generally provide electrical grounding similar to the metal plating 1312.

The grounding clip 1210 may be electrically coupled to the cover glass support structure 1110 via one or more conductive elements. For example, the touch FPC 218 may comprise a touch FPC ground pad 1320 that may be electrically conductive and may provide grounding for the touch FPC 218. The grounding clip 1210 may be electrically coupled to the touch FPC ground pad 1320. The touch FPC 218 may comprise a touch FPC support structure 1324 which may comprise an electrically conductive material such as stainless steel. The touch FPC support structure 1324 may provide stiffness to a portion of the touch FPC 218 to allow that portion of the touch FPC 218 to be non-flexible, rigid, or firm. The touch FPC support structure 1324 may be electrically coupled to the touch FPC ground pad 1320 via a first conductive pressure sensitive adhesive (PSA) 1322. The touch FPC support structure 1324 may be electrically coupled to the glass cover support structure 1110 via a second conductive PSA 1326.

A ground path may be formed from the cover glass support structure 1110 to the metal plating 1312 of the frame 1310 via the second conductive PSA 1326, the touch FPC support structure 1324, the first conductive PSA 1322, the touch FPC ground pad 1320, and the grounding clip 1210. It is to be understood that a ground path may have a different route via electrically conductive elements. For example, the touch FPC ground pad 1320 and/or the touch FPC support structure may be omitted, as well as the corresponding electrically conductive PSAs 1322,1026. It is to be understood that the ground path may be advantageous to dissipate or provide grounding for electric static discharge (ESD). For example, an ESD event may occur when a user actuates the first button 108 with a finger, but the ground path via at least the cover glass support structure 1110 may advantageously cause the ESD to discharge into the metal plating 1312 of the frame 1310 and protect ESD-sensitive components of the electronic device 100.

Figure 14:
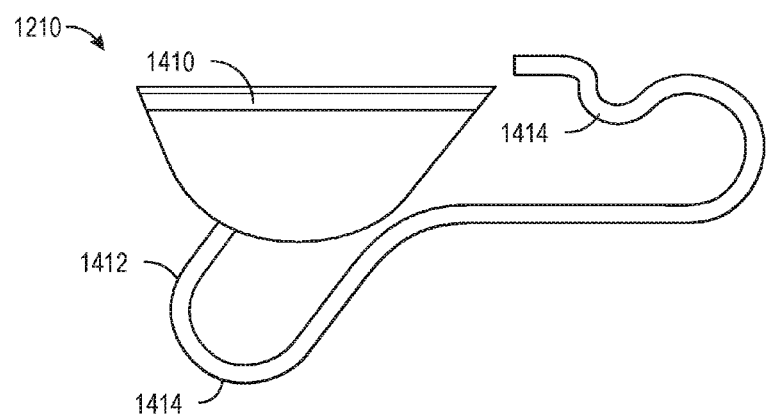
FIG. 14 illustrates an example grounding clip, in accordance with embodiments of the present invention.

FIG. 14 illustrates an example grounding clip 1210, in accordance with embodiments of the present invention. The grounding clip 1210 may comprise a body 1410 and a prong 1412. Under some embodiments, the body 1410 may electrically couple to the touch FPC ground pad 1320. Under some embodiments, the prong 1412 may comprise a bend 1414 that may electrically couple to the metal plating 1312 of the frame 1310. Under some embodiments, the prong 1412 may comprise a tip 1416 that may electrically couple to a touch sensor grounding ring of the touch sub-assembly. Such a touch sensor grounding ring may encompass or surround the capacitance grid pattern, signal lines, traces, and the like. Under some embodiments, the body 1410 of the grounding clip 1210 may be surface-mounted to the touch FPC 218. It is to be understood that the prong 1412 may form a spring such that the bend 1414 presses against the metal plating 1312 of the frame 1310.

Figure 15:
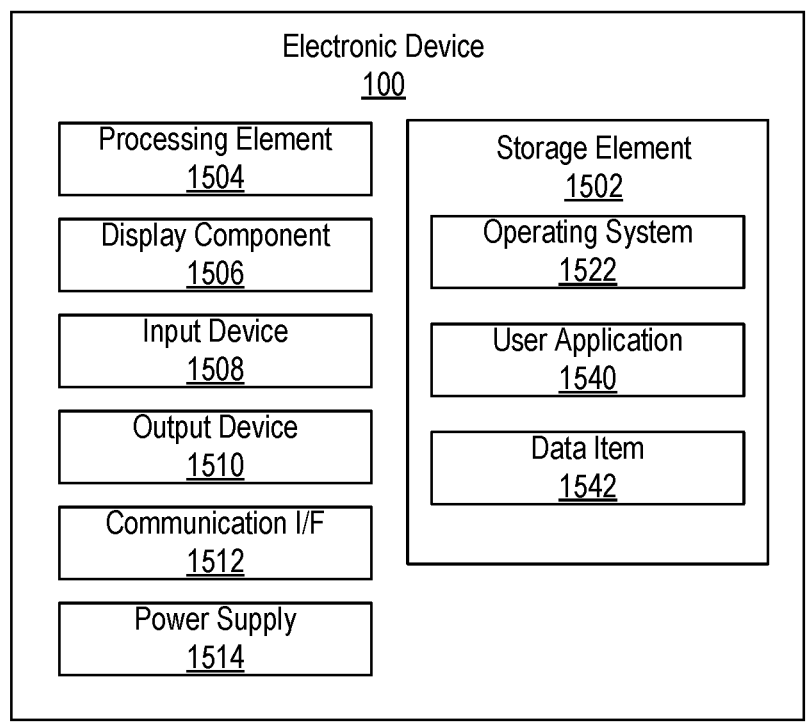
FIG. 15 illustrates an example block diagram of an electronic device, in accordance with embodiments of the present invention.

FIG. 15 illustrates an example block diagram of an electronic device 100, in accordance with embodiments of the present invention. The electronic device 100 may be implemented as any of a number of electronic devices, such as an e-book reader, a tablet computing device, a smartphone, a media player, a portable gaming device, a portable digital assistant, a laptop computer, a desktop computer, and other devices providing media presentation functionality. It should be understood that various types of computing devices including a processing element, a memory, and a user interface for receiving user input can be used in accordance with various embodiments discussed herein.

The electronic device 100 may include a display component 1506. The display component 1506 may comprise, for example, one or more devices such as cathode ray tubes (CRTs), liquid crystal display (LCD) screens, gas plasma-based flat panel displays, LCD projectors, or other types of display devices, etc. The electronic device 100 may include one or more input devices 1508 operable to receive inputs from a user. The input devices 1508 can include, for example, a push button, touch pad, touch screen, wheel, joystick, keyboard, mouse, trackball, keypad, accelerometer, light gun, game controller, or any other such device or element whereby a user can provide inputs to the electronic device 100. These input devices 1508 may be incorporated into the electronic device 100 or operably coupled to the electronic device 100 via wired or wireless interface. For computing devices with touch sensitive displays, the input devices 1508 can include a touch sensor that operates in conjunction with the display component 1506 to permit users to interact with the image displayed by the display component 1506 using touch inputs (e.g., with a finger or stylus). The electronic device 100 may also include an output device 1510, such as one or more audio speakers.

The electronic device 100 may also include at least one communication interface 1512 comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. It should be understood that the electronic device 100 may also include one or more wired communications interfaces for coupling and communicating with other devices, such as a USB port. The electronic device 100 may also include a power supply 1514, such as, for example, a rechargeable battery operable to be recharged through conventional plug-in approaches, or through other approaches such as capacitive charging.

The electronic device 100 may also include a processing element 1504 for executing instructions and retrieving data stored in a storage element 1502 or memory. As would be apparent to one of ordinary skill in the art, the storage element 1502 can include one or more different types of non-transitory memory, data storage, or computer-readable storage media, such as, for example, a first data storage for program instructions for execution by the processing element 1504, and a second data storage for images or data and/or a removable storage for transferring data to other devices. The storage element 1502 may store software for execution by the processing element 1504, such as, for example, operating system software 1522 and user applications 1540. The storage element 1502 may also store a data item 1542, such as, for example, data files corresponding to one or more applications 1540.

Embodiments of the present invention may provide various advantages not provided by prior art systems. An exemplary advantage of some disclosed embodiments of an electronic device may be that the lighted display is provided with a more uniform color distribution across the surface of the display. In addition, the manufacturing processes may be simplified and provided with increased reliability as a result of the autoclave and plasma treatment processes described herein.

While the invention has been described in terms of particular embodiments and illustrative figures, those of ordinary skill in the art will recognize that the invention is not limited to the embodiments or figures described. Many of the embodiments described above in relation to an e-book reader may be applied to a variety of electronic devices.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the processes, flowcharts, and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is to be understood that all such variations are within the scope of the present disclosure.

Also, any logic or application described herein that comprises software or code can be embodied in any non-transitory computer-readable medium for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. An electronic reader device comprising:
a processor;
memory electronically coupled to the processor, wherein the memory is configured to store a content item;
a reflective display sub-assembly configured to display the content item, the reflective display sub-assembly comprising:
  a plastic sheet;
  a glass substrate coupled to the plastic sheet;
  an electrophoretic display (EPD) layer coupled to the glass substrate;
  a plastic film coupled to the EPD layer; and
  a flexible printed circuit (FPC) coupled to an edge of the glass substrate, the FPC operatively coupled to the processor;
a light sub-assembly comprising:
  a light FPC operatively coupled to the processor, the light FPC comprising a plurality of conductive contact pads, wherein a first one of the plurality of conductive contact pads comprises a target fiducial;
  a plurality of light-emitting diodes (LED), each LED of the plurality of LEDs being coupled to a corresponding one of the plurality of conductive contact pads;
  a planar light guide having a first edge adjacent to the plurality of light LEDs, a first side, and an opposing second side, the second side being coupled to the plastic film, wherein the planar light guide comprises a pattern of optical surface features configured to direct light from the plurality of LEDs to the reflective display sub-assembly and an alignment feature aligned with the target fiducial;
  a first tape layer adhered to a portion of the light FPC and a first portion of the first side of the planar light guide, the first tape layer comprising a white tape and a first adhesive material containing a yellow pigment; and
  a second tape layer adhered to the first tape layer and a second portion of the first side of the planar light guide, the second tape layer comprising a black tape and a second adhesive material; and
a touch sub-assembly configured to receive touch input, the touch sub-assembly coupled to the second side of the light guide.

2. The electronic reader device of claim 1, wherein the light sub-assembly further comprises:
a first stiffener member comprising metal coupled to the light FPC; and
a second stiffener member comprising polyethylene terephthalate (PET) removably coupled to the first stiffener member.

3. The electronic reader device of claim 1, wherein the EPD layer comprises four corner regions and the glass substrate comprises four corner regions, the electronic reader device further comprising:
a first sealing material comprising an edge cured moisture barrier, the first sealing material formed on the four corner regions; and
a second sealing material comprising a room temperature vulcanized (RTV) silicone, the second sealing material formed on the two of the four corner regions of the glass substrate closest to the light FPC.

4. An electronic device comprising:
a display sub-assembly;
a light sub-assembly coupled to the display sub-assembly, the light sub-assembly comprising:
  a light flexible printed circuit (FPC), the light FPC comprising a target fiducial;
  a plurality of light sources coupled to the light FPC;
  a light guide having a first edge adjacent to the plurality of light sources, wherein the light guide comprises a pattern of optical surface features and an alignment feature aligned with the target fiducial;
  a first tape layer adhered to a portion of the light FPC and a first portion of a first side of the light guide, the first tape layer comprising a yellow pigment; and
  a second tape layer adhered to the first tape layer; and
a touch sub-assembly coupled to the light sub-assembly, wherein the touch sub-assembly is configured to receive touch input.

5. The electronic device of claim 4, wherein:
the first tape layer comprises a white tape and a first adhesive material containing the yellow pigment.

6. The electronic device of claim 4, further comprising:
a first stiffener member coupled to the light FPC.

7. The electronic device of claim 6, further comprising:
a second stiffener member removably coupled to the first stiffener member.

8. The electronic device of claim 4, further comprising:
a glass substrate comprising four corner regions;
an electrophoretic display (EPD) comprising four sides;
a first sealing material comprising an edge cured moisture barrier, the first sealing material formed on the four sides; and
a second sealing material comprising a room temperature vulcanized (RTV) silicone, the second sealing material formed on the two of the four corner regions of the glass substrate closest to the light FPC.

9. The electronic device of claim 4, wherein:
the light FPC comprises a plurality of conductive contact pads, wherein a first one of the plurality of conductive contact pads comprises the target fiducial; and
each of the plurality of light sources is coupled to a corresponding one of the plurality of conductive contact pads.

10. The electronic device of claim 4, wherein:
the second tape layer comprises a black tape.

11. The electronic device of claim 4, wherein:
the second tape layer comprises a plurality of perforations.

12. The electronic device of claim 4, wherein:
the second tape layer covers a portion of the pattern of optical surface features.

13. The electronic device of claim 4, further comprising a cover glass coupled to the touch sub-assembly with a first optically clear adhesive (OCA) layer, wherein:
the touch sub-assembly is coupled to the light sub-assembly with a second OCA layer; and
the light sub-assembly is coupled to the display sub-assembly with a third OCA layer.

14. The electronic device of claim 4, wherein:
the display sub-assembly comprises:
a plastic sheet having a first surface and an opposing second surface;
a glass substrate having a first surface and an opposing second surface, wherein the second surface of the glass substrate is coupled to the first surface of the plastic sheet;
an electrophoretic display (EPD) layer having a first surface and an opposing second surface, wherein the second surface of the EPD layer is coupled to the first surface of the glass substrate;
a plastic film having a first surface and an opposing second surface, wherein the second surface of the plastic film is coupled to the first surface of the EPD layer; and
a first display FPC coupled to an edge of the glass substrate, wherein the display sub-assembly is configured to display content.

15. An electronic device comprising:
a processor;
memory electronically coupled to the processor;
a reflective display sub-assembly configured to display content, the reflective display sub-assembly comprising:
a glass substrate;
an electrophoretic display (EPD) layer coupled to the glass substrate; and
a flexible printed circuit (FPC) coupled to the glass substrate, the FPC operatively coupled to the processor;
a light sub-assembly comprising:
a light FPC operatively coupled to the processor, the light FPC comprising a contact pad;
a light source electrically coupled to the contact pad of the light FPC;
a light guide having a first edge adjacent to the light source, wherein the light guide comprises a pattern of optical surface features configured to direct light from the light source to the reflective display sub-assembly;
a first tape layer adhered to the light FPC and to a first side of the light guide, the first tape layer comprising a yellow pigment; and
a second tape layer adhered to the first tape layer, the second tape layer comprising a black tape; and
a touch sub-assembly configured to receive touch input, the touch sub-assembly coupled to the light guide.

16. The electronic device of claim 15, wherein:
the first tape layer further comprises a white tape and a first adhesive material containing the yellow pigment.

17. The electronic device of claim 15, further comprising:
a first stiffener member coupled to the light FPC.

18. The electronic device of claim 17, further comprising:
a second stiffener member removably coupled to the first stiffener member.

19. The electronic device of claim 15, wherein the EPD layer comprises four sides and the glass substrate comprises four corner regions, the electronic device further comprising:
a first sealing material comprising an edge cured moisture barrier, the first sealing material formed on the four sides of the EPD layer; and
a second sealing material comprising a room temperature vulcanized (RTV) silicone, the second sealing material formed on the two of the four corner regions of the glass substrate closest to the light FPC.

20. The electronic device of claim 15, wherein:
the second tape layer comprises a plurality of perforations.

* * * * *